United States Patent
Fujii et al.

(10) Patent No.: US 7,659,943 B2
(45) Date of Patent: Feb. 9, 2010

(54) INFORMATION-PROCESSING APPARATUS AND REMOVABLE SUBSTRATE USED THEREIN

(75) Inventors: Takeyuki Fujii, Tokyo (JP); Tetsujiro Kondo, Tokyo (JP); Kazutaka Ando, Kanagawa (JP)

(73) Assignee: Sony Corporation, Tokyo (JP)

( * ) Notice: Subject to any disclaimer, the term of this patent is extended or adjusted under 35 U.S.C. 154(b) by 807 days.

(21) Appl. No.: 11/340,220

(22) Filed: Jan. 26, 2006

(65) Prior Publication Data

US 2006/0176404 A1 Aug. 10, 2006

(30) Foreign Application Priority Data

Jan. 27, 2005 (JP) ............................. 2005-020054

(51) Int. Cl.
*H04N 5/21* (2006.01)
(52) U.S. Cl. ...................................... 348/607; 348/624
(58) Field of Classification Search ................. 348/607, 348/624, 625, 627, 606; 382/275; *H04N 5/21, H04N 5/213*
See application file for complete search history.

(56) References Cited

U.S. PATENT DOCUMENTS 6,678,330 B1 * 1/2004 Kondo et al. ........... 375/240.24
7,319,494 B2 * 1/2008 Wredenhagen et al. ..... 348/607

FOREIGN PATENT DOCUMENTS

| JP | S61-57662 | 4/1986 |
|---|---|---|
| JP | 11-510968 | 9/1999 |
| JP | 2000195173 | 7/2000 |
| JP | 2001-168473 | 6/2001 |
| JP | 2001-332761 | 11/2001 |
| JP | 2003-520453 | 7/2003 |
| JP | 2005-244226 | 9/2005 |
| KR | 20050003275 | 1/2005 |

* cited by examiner

*Primary Examiner*—Sherrie Hsia
(74) *Attorney, Agent, or Firm*—K&L Gates LLP

(57) ABSTRACT

An information-processing apparatus is provided. For example, an information-processing apparatus has a noise-reduction-processing unit configured to reduce noise included in a received informational signal, an adjustment unit configured to allow a user to adjust a value of a noise reduction level in the noise-reduction-processing unit, a noise-amount-detecting unit configured to detect an amount of the noise contained in the received informational signal, and a storage control unit configured to control at least any one of an amount of noise that is detected by the noise-amount-detecting unit and paired data relative to data on a value of the noise reduction level that is adjusted by the adjustment unit and data on an amount of noise that is detected by the noise-amount-detecting unit at the adjustment by the adjustment unit.

20 Claims, 21 Drawing Sheets

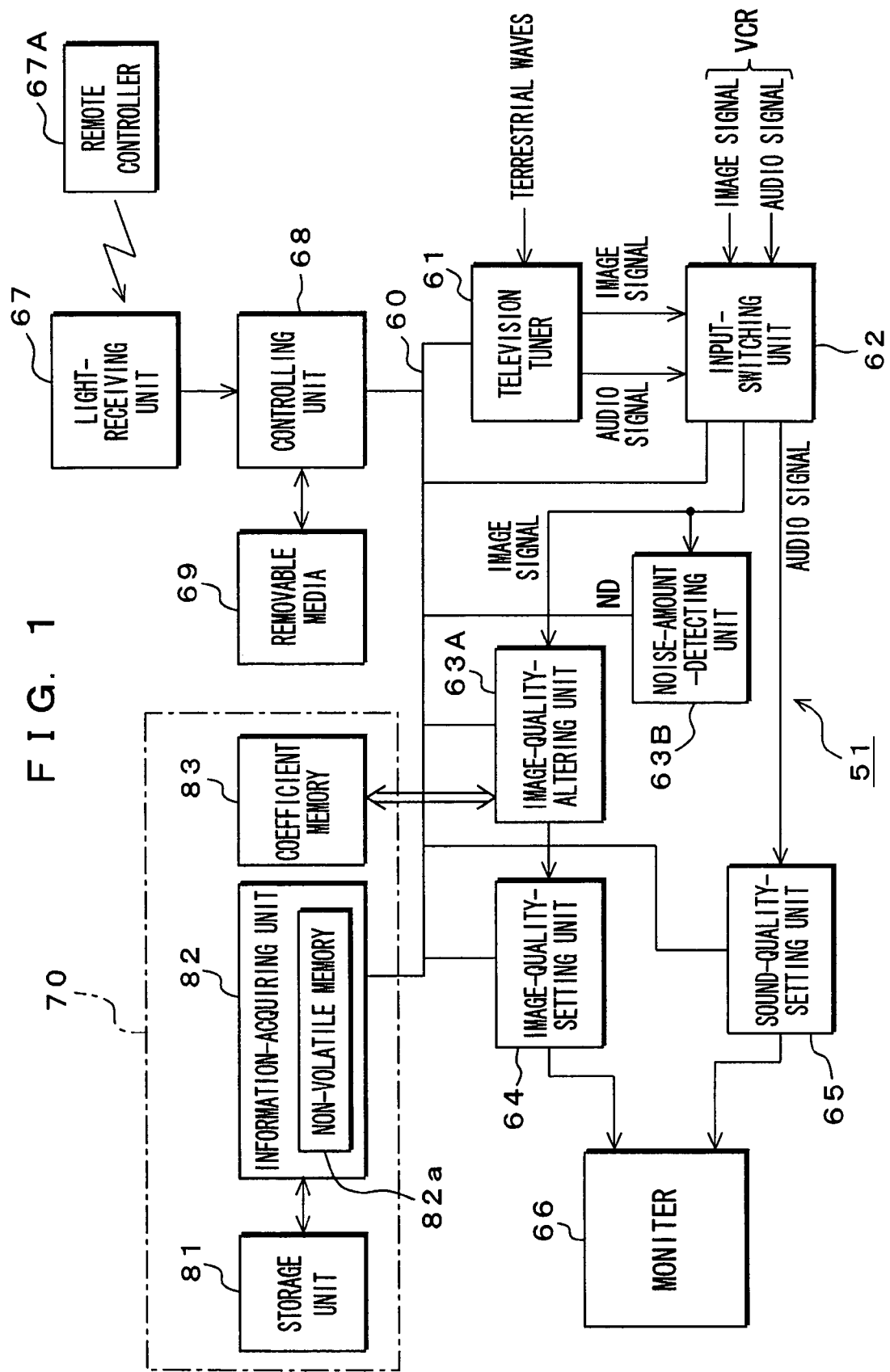

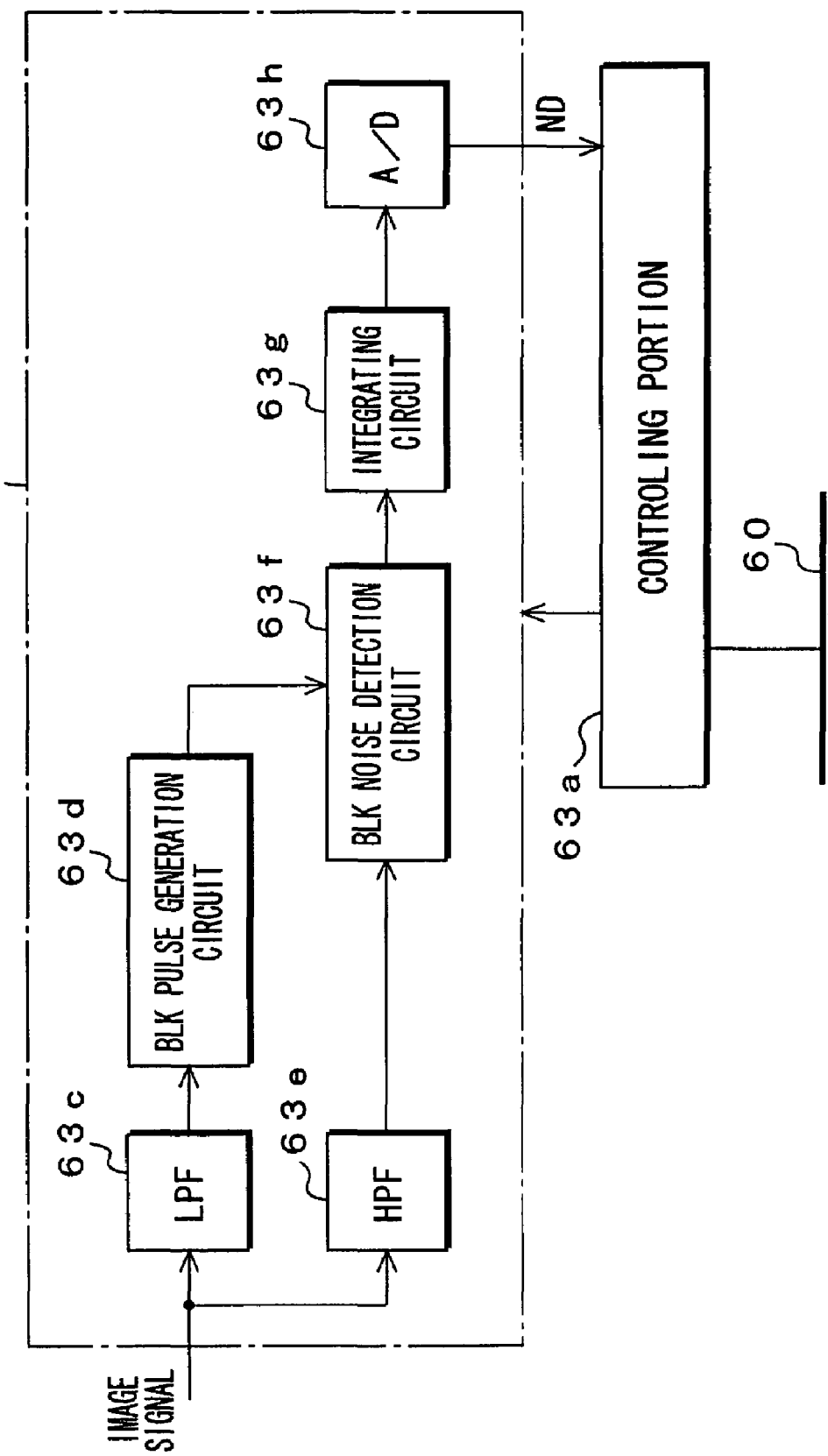

FIG. 3

| | |
|---|---|
| 2003/11/07 | AMOUNT OF NOISE;07 |
| ⋮ | |
| 2003/11/07 | AMOUNT OF NOISE;09 |
| 2003/11/07 | AMOUNT OF NOISE;15 |
| ⋮ | |
| 2003/11/07 | AMOUNT OF NOISE;17 |
| 2003/11/07 | AMOUNT OF NOISE;11 |
| ⋮ | |
| 2003/11/07 | AMOUNT OF NOISE;12 |
| 2003/11/08 | AMOUNT OF NOISE;86 |
| ⋮ | |
| 2003/11/08 | AMOUNT OF NOISE;84 |
| 2003/11/08 | AMOUNT OF NOISE;75 |
| ⋮ | |
| 2003/11/08 | AMOUNT OF NOISE;73 |
| 2003/11/08 | AMOUNT OF NOISE;65 |
| ⋮ | |
| 2003/11/08 | AMOUNT OF NOISE;68 |
| 2003/11/09 | AMOUNT OF NOISE;24 |
| ⋮ | |
| 2003/11/09 | AMOUNT OF NOISE;30 |
| 2003/11/09 | AMOUNT OF NOISE;38 |
| ⋮ | |
| 2003/11/09 | AMOUNT OF NOISE;40 |
| 2003/11/09 | AMOUNT OF NOISE;48 |
| ⋮ | |
| 2003/11/09 | AMOUNT OF NOISE;45 |
| 2003/11/10 | AMOUNT OF NOISE;54 |
| ⋮ | |
| 2003/11/10 | AMOUNT OF NOISE;53 |
| 2003/11/10 | AMOUNT OF NOISE;55 |
| ⋮ | |
| 2003/11/10 | AMOUNT OF NOISE;52 |
| 2003/11/10 | AMOUNT OF NOISE;62 |
| ⋮ | |
| 2003/11/10 | AMOUNT OF NOISE;60 |
| ⋮ | |

F I G. 4

```
2003/11/07  12:12:59  AMOUNT OF NOISE;7   VALUE OF NOISE REDUCTION LEVEL;28
2003/11/07  13:23:23  AMOUNT OF NOISE;8   VALUE OF NOISE REDUCTION LEVEL;31
2003/11/07  14:52:59  AMOUNT OF NOISE;17  VALUE OF NOISE REDUCTION LEVEL;28
2003/11/07  20:45:23  AMOUNT OF NOISE;12  VALUE OF NOISE REDUCTION LEVEL;26
2003/11/08  12:18:35  AMOUNT OF NOISE;12  VALUE OF NOISE REDUCTION LEVEL;31
2003/11/08  13:45:20  AMOUNT OF NOISE;86  VALUE OF NOISE REDUCTION LEVEL;78
2003/11/08  20:20:02  AMOUNT OF NOISE;73  VALUE OF NOISE REDUCTION LEVEL;73
2003/11/08  22:23:55  AMOUNT OF NOISE;68  VALUE OF NOISE REDUCTION LEVEL;79
2003/11/09  09:25:05  AMOUNT OF NOISE;24  VALUE OF NOISE REDUCTION LEVEL;28
2003/11/09  15:09:39  AMOUNT OF NOISE;31  VALUE OF NOISE REDUCTION LEVEL;29
2003/11/09  19:53:17  AMOUNT OF NOISE;40  VALUE OF NOISE REDUCTION LEVEL;35
2003/11/09  23:48:31  AMOUNT OF NOISE;48  VALUE OF NOISE REDUCTION LEVEL;45
2003/11/10  07:48:28  AMOUNT OF NOISE;54  VALUE OF NOISE REDUCTION LEVEL;60
2003/11/10  14:02:51  AMOUNT OF NOISE;52  VALUE OF NOISE REDUCTION LEVEL;45
2003/11/10  18:13:47  AMOUNT OF NOISE;60  VALUE OF NOISE REDUCTION LEVEL;68
                              ⋮
```

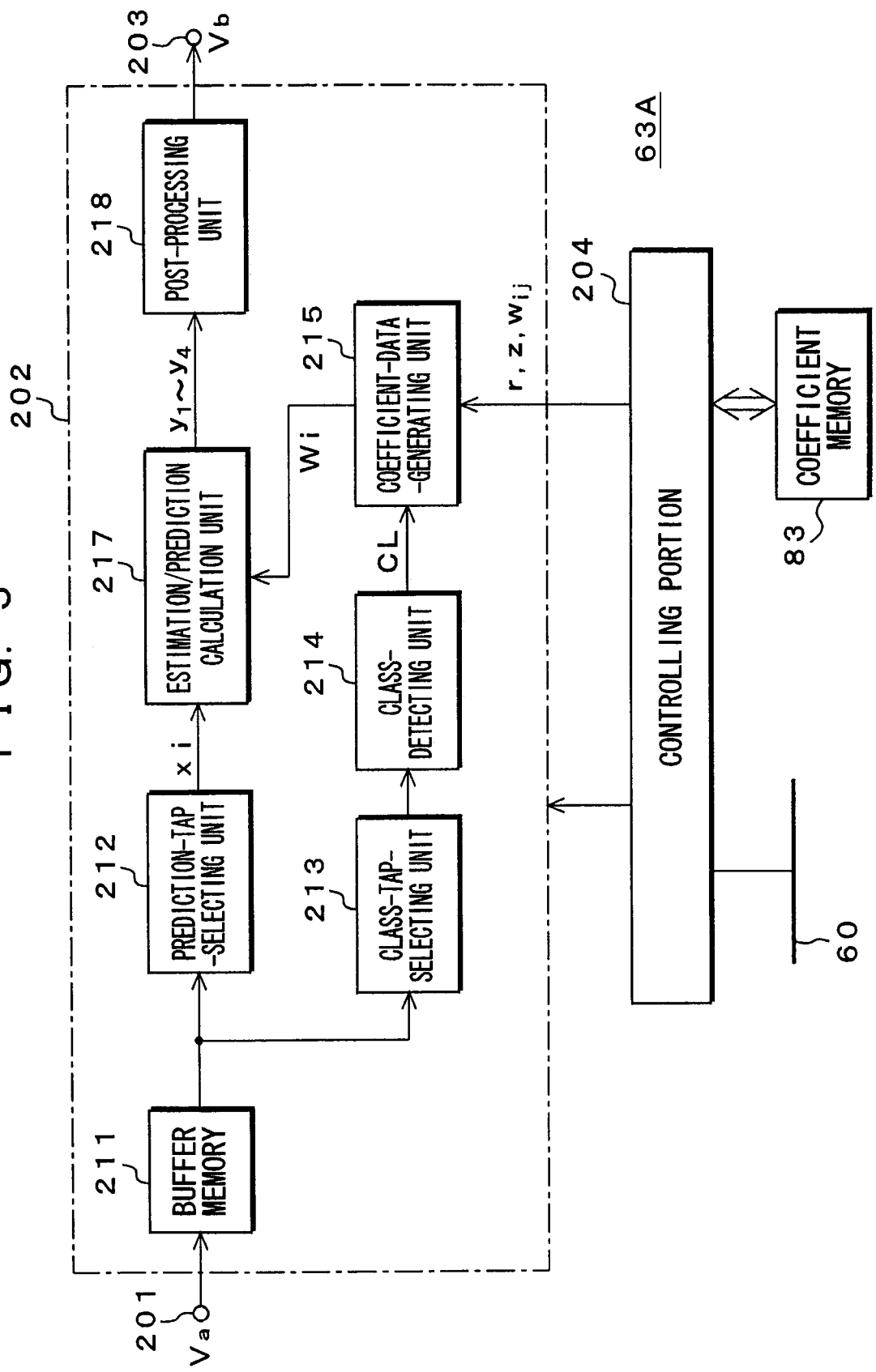

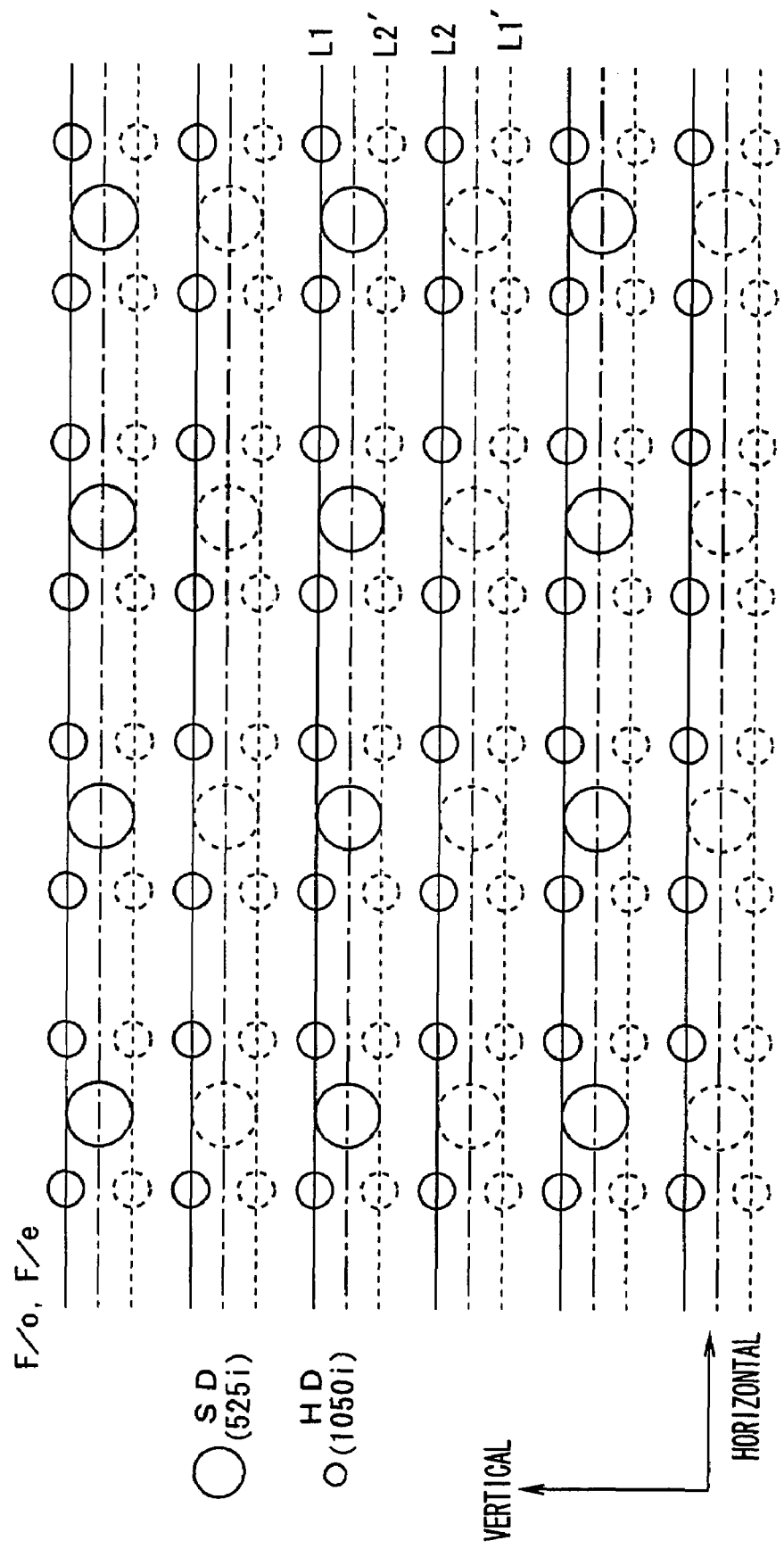

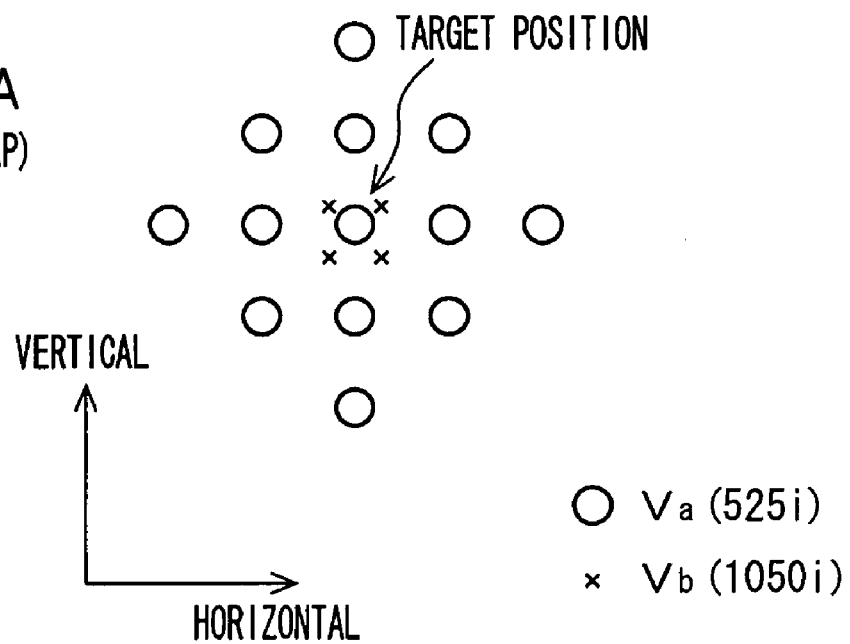
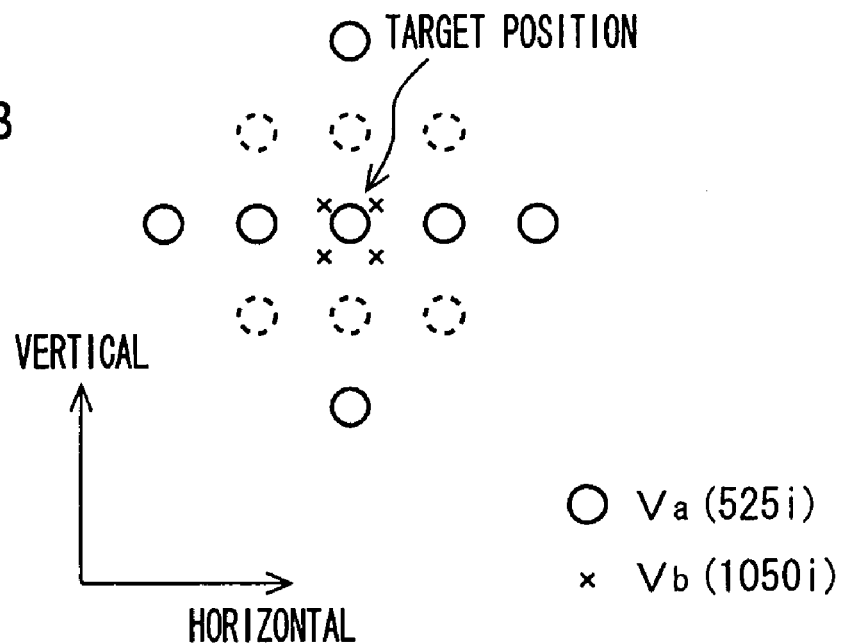

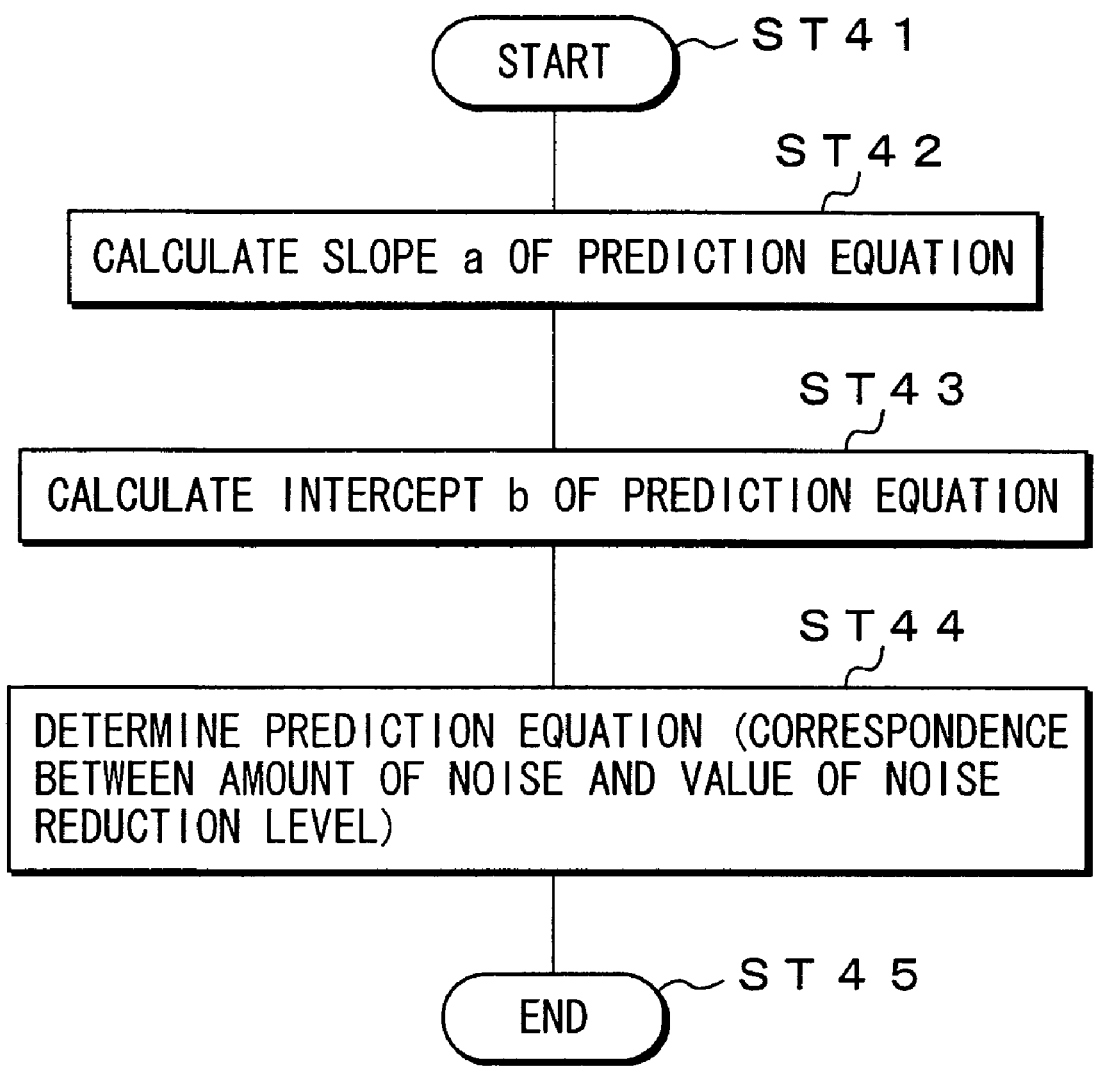

FIG. 15

- ST51 START
- ST52 HAVE ALL OF COMBINATIONS BEEN COMPLETED?
  - YES → ST61
  - NO ↓
- ST53 SET COMBNATION OF DIVIDED NUMBER AND DIVIDED POSITION
- ST54 SEPARATE MULTIPLE ITEMS OF PAIRED DATA INTO EACH SECTION OF SET COMBINATION
- ST55 SET PREDICTION EQUATION FOR EVERY SECTION
- ST56 CALCULATE PREDICTION ERROR
- ST57 CALCULATE TOTAL PREDICTION ERROR
- ST58 IS TOTAL PREDICTION ERROR MINIMUM?
  - NO → (loop back to ST52)
  - YES ↓
- ST59 STORE TOTAL PREDICTION ERROR
- ST60 STORE INFORMATION ON COMBINATION AND PREDICTION EQUATION OF EACH SECTION
- ST61 OUTPUT INFORMATION ON COMBINATION AND PEDICTION EQUATION OF EACH SECTION (CORRESPONDENCE OF AMOUNT OF NOISE AND VALUE OF NOISE REDUCTION LEVEL)
- ST62 END

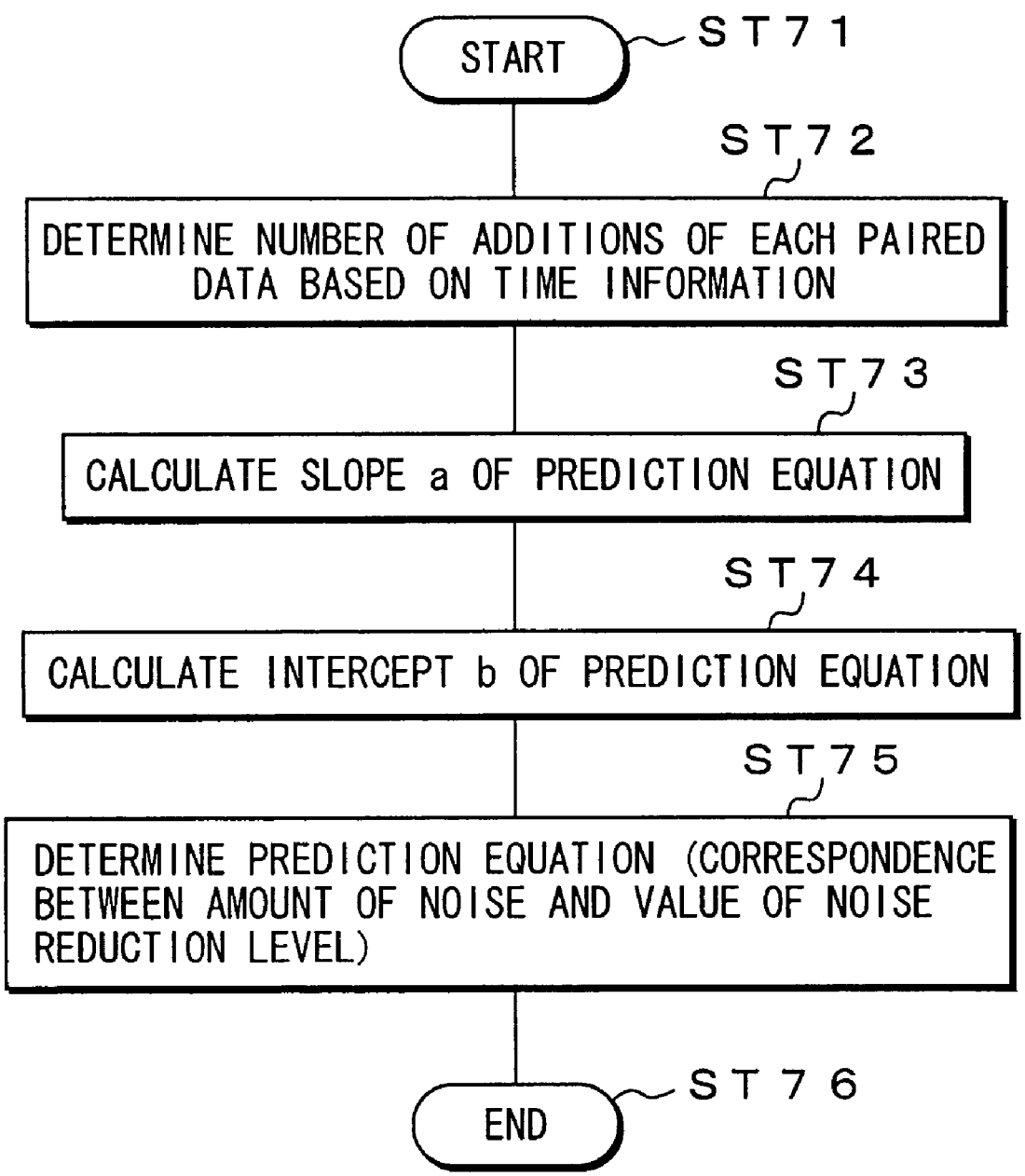

INFORMATION-PROCESSING APPARATUS AND REMOVABLE SUBSTRATE USED THEREIN

CROSS REFERENCES TO RELATED APPLICATIONS

The present application claims priority to Japanese Patent Application No.JP 2005-20054 filed in the Japanese Patent Office on Jan. 27, 2005, the entire contents of which being incorporated herein by reference.

BACKGROUND

The present application relates to an information-processing apparatus and a removable substrate used therein. More particularly, it relates to an information-processing apparatus and the like that are applicable to a television receiver or the like.

A television receiver having a noise-reduction-processing unit for reducing noise contained in a video (image) signal that is transmitted from a tuner has been formerly known. In the past, it has been conceivable that an amount of noise contained in the video signal is detected and the noise-reduction-processing unit can be operated based on a value of noise reduction level corresponding to the detected amount of noise.

For example, Japanese Utility-Model Application Publication No. S61-57662 discloses that an amount of noise contained in the video signal is detected and a high-frequency component of the video signal can be reduced corresponding to the detected amount of noise. Therefore, the above Japanese publication discloses a blanking noise detection circuit for detecting any noise contained in a received video signal during its blanking period, and a frequency-characteristic-altering circuit for altering frequency characteristic of the received video signal based on a noise detection output of the detection circuit.

SUMMARY

However, such a technology disclosed in the Japanese publication determines no correspondence between an amount of noise and a reduction amount of hi-frequency component thereof based on an amount of noise under any user's real usage environment or any user's noise reduction operations. A manufacturer determines such a correspondence based on his or her assumption in principle. Thus, it is difficult for the technology disclosed in the Japanese publication to perform noise reduction processing that is suited to a user's usage environment or a user's preference.

It is desirable to provide adjustment information on a value of noise reduction level that is suited to user's usage environment or user's preference.

According to an embodiment, there is provided an information-processing apparatus having noise-reduction-processing means for reducing noise contained in a received informational signal and adjustment means for allowing a user to adjust a value of noise reduction level in the noise-reduction-processing means. The information-processing apparatus further has noise-amount-detecting means for detecting an amount of the noise contained in a received informational signal and storage control means for controlling to be stored at least any one of an amount of noise that is detected by the noise-amount-detecting means and paired data relative to data on a value of noise reduction level that is adjusted by the adjustment means and data on an amount of noise that is detected by the noise-amount-detecting means at the adjustment by the adjustment means.

According to another embodiment, there is provided an information-processing apparatus having a noise-reduction-processing unit configured to reduce noise contained in a received informational signal and an adjustment unit configured to allow a user to adjust a value of noise reduction level in the noise-reduction-processing unit. This information-processing apparatus also has a noise-amount-detecting unit configured to detect an amount of the noise contained in the received informational signal and a storage control unit configured to control to be stored at least any one of an amount of noise that is detected by the noise-amount-detecting unit and paired data relative to data on a value of noise reduction level that is adjusted by the adjustment unit and data on an amount of noise that is detected by the noise-amount-detecting unit at the adjustment by the adjustment unit.

According an embodiment, there is provided a removable substrate that is detachably connected to an information-processing apparatus. The apparatus has noise-reduction-processing means for reducing noise contained in a received informational signal, adjustment means for allowing a user to adjust a value of noise reduction level in the noise-reduction-processing means, and noise-amount-detecting means for detecting an amount of the noise contained in the received informational signal. The removable substrate includes storage means for storing at least any one of an amount of noise that is detected by the noise-amount-detecting means and paired data relative to data on a value of noise reduction level that is adjusted by the adjustment means and data on an amount of noise that is detected by the noise-amount-detecting means at the adjustment by the adjustment means.

According to an embodiment, there is provided a removable substrate that is detachably connected to an information-processing apparatus. The apparatus has a noise-reduction-processing unit configured to reduce noise contained in a received informational signal, an adjustment unit configured to allow a user to adjust a value of noise reduction level in the noise-reduction-processing unit, and a noise-amount-detecting unit configured to detect an amount of the noise contained in the received informational signal. The removable substrate includes storage unit configured to store at least any one of an amount of noise that is detected by the noise-amount-detecting unit and paired data relative to data on a value of noise reduction level that is adjusted by the adjustment unit and data on an amount of noise that is detected by the noise-amount-detecting unit at the adjustment by the adjustment unit.

In the embodiments, the noise-reduction-processing means reduces any noise from the received informational signal. It is to be noted that the informational signal includes an image (video) signal and an audio signal. If the informational signal is an image signal, as the noise, white noise, ghost noise, block noise, mosquito noise, ringing and the like are illustrated. If the informational signal is an audio signal, as the noise, white noise, encoding noise and the like are illustrated. In the embodiments, the adjustment means for allowing a user to adjust a value of noise reduction level in the noise-reduction-processing means is provided. The noise-amount-detecting means detects an amount of the noise contained in the received informational signal.

The storage control means controls to be stored in the first or second storage means at least an amount of noise that is detected by the noise-amount-detecting means or paired data relative to data on a value of noise reduction level that is adjusted by the adjustment means and data on an amount of noise that is detected by the noise-amount-detecting means at the adjustment by the adjustment means. Thus, the first or second storage means stores an amount of the detected noise or the paired data relative to data on a value of the noise reduction level and data on an amount of the detected noise so that it is possible to acquire adjustment information on a value of noise reduction level that is suited to user's usage environment or user's preference, based on these storage contents.

For example, the removable substrate includes the storage control means and the first storage means. The removable substrate is detachably connected to the information-processing device. In this case, the information-processing device also includes the noise-reduction-processing means, the adjustment means, and the noise-amount-detecting means. Thus, if the removable substrate includes the storage means, it is possible to acquire adjustment information on a value of noise reduction level that is suited to a user's usage environment or a user's preference, when this storage means is collected, based on these storage contents in the storage means. The information-processing device (also the information-processing apparatus) can avoid a circuit for acquiring any adjustment information being provided therein to prevent its configuration from being complicated.

Further, for example, the second storage means may be connected to a prescribed network and the storage control means may be connected to the second storage means via the network interface and the network. In this case, at a side of the second storage means, it is possible to acquire adjustment information on a value of noise reduction level that is suited to user's usage environment or user's preference, based on these storage contents in the second storage means. In this case, the information-processing device (also the information-processing apparatus) can also avoid a circuit for acquiring any adjustment information being provided therein to prevent its configuration from being complicated.

For example, such the adjustment information on a value of noise reduction level includes information on correspondence between an amount of noise and a value of noise reduction level. This information on the correspondence can be determined based on plural amounts of the detected noise that is stored in the first or second storage means. This information on the correspondence can also be acquired by using, for example, multiple items of the paired data of data on a value of noise reduction level and data on an amount of noise, which are stored in the first or second storage means. The information on correspondence can be further acquired by determining a primary approximating line indicating the correspondence between the amount of noise and the value of noise reduction level using multiple items of the paired data. In this case, these multiple items of paired data can be used after the paired data has been weighted with a stored period of time. In this case, an axis of the amount of noise is divided into plural sections so that the primary approximating line can be determined for every section.

The adjustment information on the value of noise reduction level includes information on an adjustment region of the value of noise reduction level to be adjusted by the adjustment means. This information on the adjustment region can be determined based on plural amounts of the detected noise stored in the first or second storage means. This information on the adjustment region can be also determined by using, for example, multiple items of the paired data of data on a value of noise reduction level and data on an amount of noise, which is stored in the first or second storage means. This information on the adjustment region can be further determined based on a frequency of a maximum value and a frequency of a minimum value of the noise reduction level included within the plural values of the noise reduction levels. This information on the adjustment region can be additionally determined based on a weighted center of the plural values of the noise reduction levels. In this case, the plural values of the noise reduction levels may be weighted with a stored period of time.

The first holding means holds such the information on correspondence between the amount of noise and the value of noise reduction level. If the removable substrate is collected to acquire such the information on correspondence, the first holding means can hold the information on correspondence using, for example, a memory card or the like. If, however, the removable substrate that is newly connected to the information-processing device contains the first holding means, this removable substrate can provide the information-processing device with this information on correspondence without using a memory card or the like. If a side of the second storage means connected via the network acquires the information on correspondence, the first holding means can get and hold the information on correspondence via this network.

Thus, if the first holding means holds the information on correspondence between the amount of noise and the value of noise reduction level, the noise-reduction-level-value-controlling means controls a value of noise reduction level in the noise-reduction-processing means to be equal to a value of noise reduction level, at automatic mode, corresponding to an amount of noise detected in the noise-amount-detecting means based on this information on correspondence. If the information on correspondence between the amount of noise and the value of noise reduction level, which is held in the first holding means, is determined based on the amount of detected noise or the paired data relative to data on the value of noise reduction level and data on the amount of detected noise, which is stored in the first or second storage means, it is possible to adjust a value of noise reduction level automatically to the one that is suited to user's usage environment or user's preference.

The second holding means holds the above-mentioned information on an adjustment region of the value of noise reduction level. If the removable substrate is collected to acquire such information on correspondence, the second holding means can hold the corresponding information on an adjustment region using, for example, a memory card or the like. If, however, the removable substrate that is newly connected to the information-processing device contains the second holding means, this removable substrate can provide the information-processing device with this information on the adjustment region without using a memory card or the like. If a side of the second storage means connected via the network acquires the information on the adjustment region, the second holding means can get and hold the corresponding information on the adjustment region via this network.

Thus, if the second holding means holds the information on the adjustment region, the adjustment region restriction means restricts a region of the value of noise reduction level to be able to be adjusted by the adjustment means, at manual mode, based on the information on the adjustment region. If the information on the adjustment region of the value of noise reduction level to be adjusted, which is held in the second holding means, is determined based on the amount of detected noise or the paired data relative to data on the value of noise reduction level and data on the amount of detected noise, which is stored in the first or second storage means, a user can adjust a value of noise reduction level easily and surely to the one that is suited to user's usage environment or user's preference.

For example, the noise-reduction-processing means has data-selecting means for selecting multiple items of informational data based on the received informational signal. The multiple items of informational data are positioned around a target position in an output informational signal. The noise-reduction-processing means also has coefficient-data-generating means for generating coefficient data of an estimate equation using coefficient seed data and the value of noise reduction level. The noise-reduction-processing means further has calculation means for calculating and obtaining informational data of the target position in the output informational signal based on the estimate equation using the multiple items of the informational data, which are selected in the data-selecting means, and the coefficient data, which is generated in the coefficient-data-generating means. The third holding means holds the coefficient seed data. The coefficient seed data is generated using learning data on, for example, an amount of noise that stays within a range of the value of noise reduction level to be adjusted by the adjustment means.

Additional features and advantages are described herein, and will be apparent from, the following Detailed Description and the figures.

BRIEF DESCRIPTION OF THE FIGURES

FIG. 1 is a block diagram for showing a configuration of an image-processing apparatus according to an embodiment;

FIG. 2 is a block diagram for showing a configuration of a noise-amount-detecting unit;

FIG. 3 is a diagram for showing an example of stored data (on an amount of noise);

FIG. 4 is a diagram for showing an example of stored data (on paired data relative to data on a value of noise reduction level and data on an amount of noise);

FIG. 5 is a block diagram for showing a configuration of an embodiment of an image-quality-altering unit;

FIG. 6 is a diagram for showing a relationship of pixel positions between an SD signal and an HD signal;

FIGS. 7A and 7B are diagrams each for illustrating a pattern of a prediction tap and a class tap;

FIG. 14 is a flowchart for showing any calculation processing (method 1) of the correspondence between the value of noise reduction level and the amount of noise;

FIG. 15 is a flowchart for showing any calculation processing (method 2) of the correspondence between the value of noise reduction level and the amount of noise;

FIG. 16 is a flowchart for showing any calculation processing (method 3) of the correspondence between the value of noise reduction level and the amount of noise;

DETAILED DESCRIPTION

Figure 8:
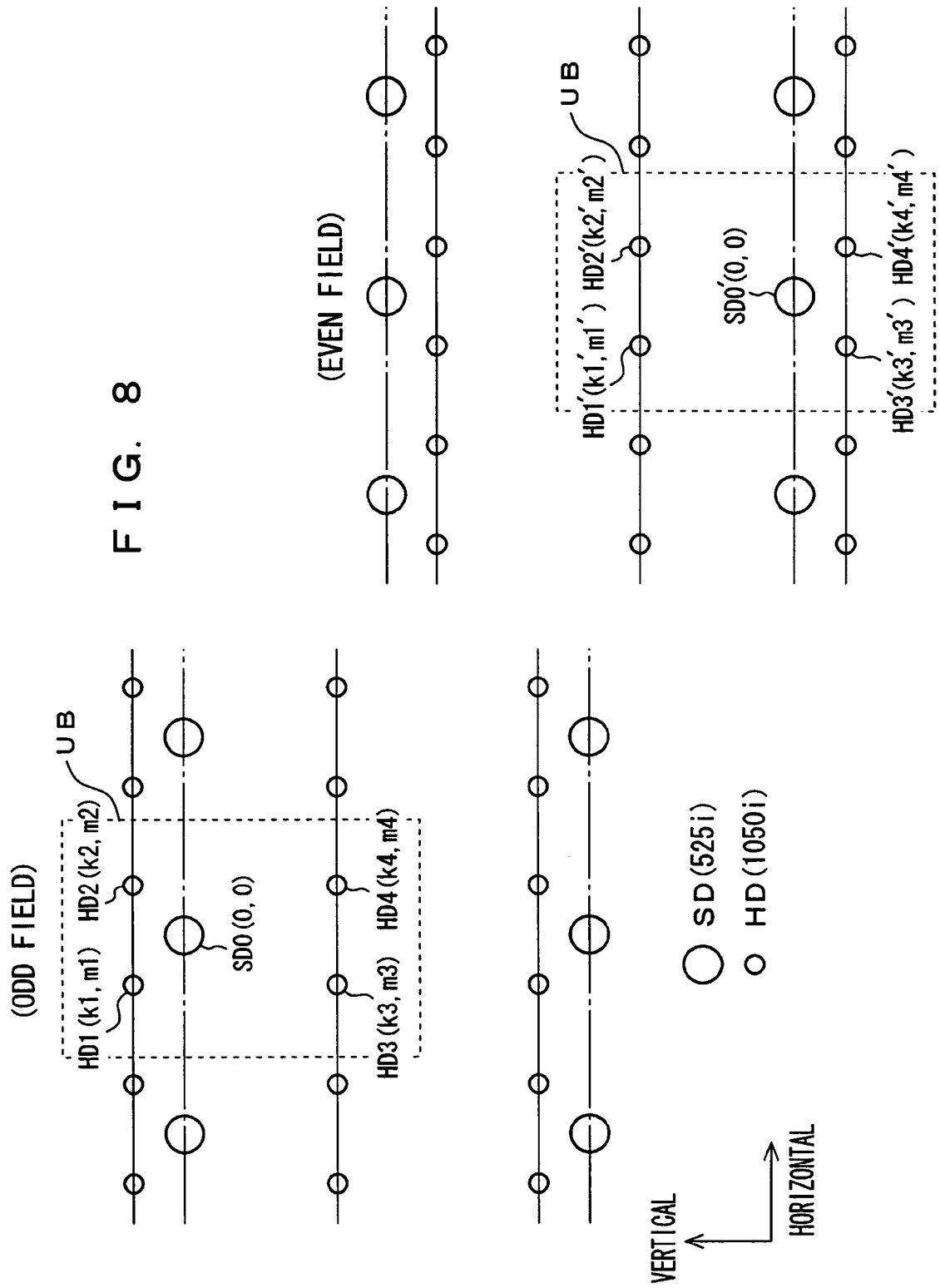
FIG. 8 is a diagram for showing phase lags of four pixels of HD signal in a unit pixel block behind a central prediction tap.

An image-processing apparatus according to embodiments of the present invention will be described with reference to the drawings. FIG. 1 shows a configuration of an image-processing apparatus according to an embodiment.

This image-processing apparatus 51 has a television tuner 61, an input-switching unit 62, an image-quality-altering unit 63A, a noise-amount-detecting unit 63B, an image-quality-setting unit 64, a sound-quality-setting unit 65, a monitor 66, a light-receiving unit 67, a controlling unit 68, removable media 69, and a removable substrate 70. The removable substrate 70 includes a storage unit 81, an information-acquiring unit 82, and a coefficient memory 83. These units and the like are connected to each other via a bus 60 through which various necessary control commands are supplied to each of the units and the like.

The television tuner 61 demodulates a broadcast signal from terrestrial waves received via an antenna, which is not shown, and transmits its image signal and audio signal to the input-switching unit 62. To the input-switching unit 62, VCR, which is not shown, also transmits an image signal and an audio signal. It is to be noted that the television tuner 61 and the VCR constitute the image signal source. Based on controls by the controlling unit 68, the input-switching unit 62 selects image and audio signals relative to a desired image signal source among the received image and audio signals, and supplies the selected image signal to the image-quality-altering unit 63A as well as supplies the selected audio signal to the sound-quality-setting unit 65.

Based on controls by the controlling unit 68 or the like, the image-quality-altering unit 63A alters image quality of the received image signal and transmits it to the image-quality-setting unit 64. Namely, the image-quality-altering unit 63A performs image quality alteration processing relative to resolution and noise reduction level on the received image signal.

The noise-amount-detecting unit 63B detects an amount of noise (herein, white noise) contained in the image signal. The noise-amount-detecting unit 63B has, for example, a configuration shown in FIG. 2.

This noise-amount-detecting unit 63B has a controlling portion 63a and a detection body 63b. The controlling portion 63a controls the entire operation of the noise-amount-detecting unit 63B including operations of the detection body 63b. The detection body 63b detects an amount of noise contained in the received image (video) signal. The controlling portion 63a is connected to the bus 60. The controlling portion 63a dispatches to the bus 60 an amount of noise ND that is detected in the detection body 63b for every frame, for example.

The detection body 63b has a low pass filter (LPF) 63c, a blanking pulse (BLK pulse) generation circuit 63d, a high pass filter (HPF) 63e, a blanking noise (BLK noise) detection circuit 63f, an integrating circuit 63g, and an A/D converter 63h.

The low pass filter 63c filters only a low frequency component of the received image (video) signal, particularly, a low frequency component of horizontal and vertical blanking signals and a synchronization signal. The blanking pulse generation circuit 63d generates the horizontal or vertical blanking signal based on the signal received from the low pass filter 63c. The high pass filter 63e filters only a high frequency component of the received image (video) signal including noise.

The blanking noise detection circuit 63f detects a high frequency component during blanking period of the signal received from the high pass filter 63e based on the blanking pulse generated in the blanking pulse generation circuit 63d. In this case, no image signal is present during the blanking period thereof so that a high frequency component thereof during this blanking period is noise component. The integrating circuit 63g integrates the noise component detected in the blanking noise detection circuit 63f to convert it to voltage signal corresponding to the amount of noise. The A/D converter 63h converts a signal (voltage signal) received from the integrating circuit 63g from an analog signal to a digital signal to obtain the amount of noise ND.

Referring back to FIG. 1, the image-quality-setting unit 64 sets any image quality such as brightness and hue other than those to be altered in the image-quality-altering unit 63A. The image signal in which its brightness, hue and the like is thus set by the image-quality-setting unit 64 is supplied to the monitor 66. The sound-quality-setting unit 65 adjusts and sets sound quality of the received audio signal based on the control commands of the controlling unit 68 and supplies it to the monitor 66. The monitor 66 displays an image corresponding to the received image signal and outputs sound corresponding to the received audio signal from a built-in speaker.

The controlling unit 68 is composed of, for example, a microcomputer. The light-receiving unit 67 receives an infrared light signal from a remote controller 67A, which is shown in FIG. 1, and transmits to the controlling unit 68 a signal corresponding to the infrared light signal. The removable media 69 are equipped, if necessary, and supplies any programs and the like stored therein to the controlling unit 68. Based on the signals received from the light-receiving unit 67, the controlling unit 68 generates any corresponding control commands and transmits them to each of the units and the like via the bus 60.

The information-acquiring unit 82 of the removable substrate 70 is composed of, for example, a microcomputer and the like and controls storage operations of the storage unit 81 based on the control commands, the amount of noise and the like that are received through the bus 60. In this sense, the information-acquiring unit 82 constitutes the storage control means or unit. The storage unit 81 stores an amount of noise acquired, for example, for every frame in the information-acquiring unit 82. FIG. 3 shows an example of the stored data. Every time when the image-quality-altering unit 63A adjusts the value of noise reduction level, the storage unit 81 also stores the paired data, which is acquired in information-acquiring unit 82, relative to data on the adjusted value of noise reduction level and data on the detected amount of noise at this adjustment. FIG. 4 shows an example of the stored paired data.

The information-acquiring unit 82 has a non-volatile memory 82a. This non-volatile memory 82a stores adjustment information on the value of noise reduction level. This non-volatile memory 82a constitutes the first holding unit or means and may hold information on correspondence between an amount of noise and a value of noise reduction level, which are used at automatic mode, as adjustment information of the value of noise reduction level. This non-volatile memory 82a also constitutes the second holding means or unit and may hold information on adjustment region of the value of noise reduction level, which is used at manual mode, as adjustment information on the value of noise reduction level.

At automatic mode, the information-acquiring unit 82 transmits to the image-quality-altering unit 63A via bus 60 the value of noise reduction level corresponding to the amount of noise detected in the noise-amount-detecting unit 63B based on the information on correspondence between an amount of noise and a value of noise reduction level, which is stored in the non-volatile memory 82a, and controls the image-quality-altering unit 63A to perform resolution creation processing corresponding to the value of noise reduction level. In this sense, the information-acquiring unit 82 constitutes noise-reduction-level-value-controlling means.

It is to be noted that such the control may be performed in the controlling unit 68 at an information-processing device side. In this case, the controlling unit 68 acquires a value of noise reduction level corresponding to the amount of noise detected in the noise-amount-detecting unit 63B based on the information on correspondence between the amount of noise and the value of noise reduction level, which is stored in the non-volatile memory 82a of the information-acquiring unit 82, and transmits it to the image-quality-altering unit 63A. In this case, the controlling unit 68 constitutes noise-reduction-level-value-controlling means.

The coefficient memory 83 is composed of, for example, a non-volatile memory, and stores coefficient seed data, which is to be used in the image-quality-altering unit 63A, for each class. How to generate this coefficient seed data will be described later.

The following will describe a configuration of an image-quality-altering unit 63A. FIG. 5 shows a configuration of the image-quality-altering unit 63A.

This image-quality-altering unit 63A has a receiving terminal 201 for receiving an image signal Va, a processing portion 202 for processing the image signal Va received through the receiving terminal 201, a transmitting terminal 203 for transmitting an image signal Vb obtained by the processing portion 202, and a controlling portion 204 for controlling operations in the processing portion 202.

The controlling portion 204 controls the operations in the processing portion 202 based on the control commands or the like received through the bus 60. For example, the controlling portion 204 may have an MPU, an ROM storing operation program etc. of the MPU, an RAM constituting a working area for this MPU, and the like, which are not shown.

The processing portion 202 can convert the image signal Va, which is, for example, a standard definition (SD) signal of 525i signal, into the image signal Vb, which is, for example, a high definition (HD) signal of 1050i signal. The 525i signal relates to an interlaced image signal having 525 lines per one frame. The 1050i signal relates to an interlaced image signal having 1050 lines per one frame.

FIG. 6 shows a relationship of pixel positions on frames (F) of the 525i signal and the 1050i signal in which pixel positions on odd (o) fields are illustrated as solid lines and pixel positions on even (e) fields are illustrated as dotted lines. Large circular representations illustrate pixels of the 525i signal and small circular representations illustrate pixels of the 1050i signal. As shown in FIG. 6, as pixel data of the 1050i signal, there are items of line data L1 and L1' that are near the line of 525I signal and items of line data L2 and L2' that are away from the line of 525i signal. It is to be noted that L1 and L2 indicate items of the line data of odd fields and L1' and L2' indicate items of the line data of even fields. The numbers of pixels in each line of the 1050i signal are twice the numbers of pixels in each line of the 525i signal.

Referring back to FIG. 5, the processing portion 202 has a buffer memory 211, a prediction-tap-selecting unit 212 and a class-tap-selecting unit 213. The buffer memory 211 temporarily stores the image signal Va received from the receiving terminal 201. The tap-selecting units 212 and 213 respectively extract multiple items of pixel data that are positioned around a target position in the image signal Vb selectively as the prediction tap data and class tap data, respectively, based on the image signal Va stored in the buffer memory 211.

FIG. 7A illustrates a pattern example of multiple items of pixel data that are extracted as the prediction tap data. FIG. 7B illustrates a pattern example of multiple items of pixel data (a part shown by solid line) that are extracted as class tap data. Although in FIGS. 7A and 7B, the items of pixel data as the prediction tap data and class tap data are extracted from a present field in which the target position stays, they can be extracted from a prescribed number of fields that are positioned before or after along a time direction thereof.

The processing portion 202 also has a class-detecting unit 214. The class-detecting unit 214 performs data compression processing on the items of pixel data as the class tap data that are extracted by the class-tap-selecting unit 213 to obtain a class code CL indicating a class to which pixel data of the target position in the image signal Vb belongs. For example, as the data compression processing, adaptive dynamic range coding (ADRC), differential pulse code modulation (DPCM), vector quantization (VQ) and the like can be used. In this embodiment, ADRC, for example, one-bit ADRC is used.

The following will describe a case where K-bit ADRC is used. In this case, a dynamic range DR=MAX−MIN that is difference between maximum value MAX of the pixel data included in the class tap and minimum value MIN thereof is detected. Concerning respective items of pixel data included in the class tap, the minimum value MIN thereof is subtracted from the pixel data and this subtracted value is divided by $DR/2^K$ (namely, quantized). Respective items of pixel data constituting the class tap are then re-quantized to K bits. A bit stream in which the re-quantized ones are arranged along a prescribed order is set as the class code CL.

Therefore, if using the one-bit ADRC, concerning respective items of pixel data included in the class tap, the minimum value MIN is subtracted from the pixel data and the subtracted value is divided by DR/2. Respective items of pixel data included in the class tap are then re-quantized to one bit and a bit stream in which the re-quantized ones are arranged along a prescribed order is set as the class code CL and output.

The processing portion 202 further has a coefficient-data-generating unit 215. A estimation/prediction calculation unit 217, which will be described later, calculates pixel data y of the target position in the image signal Vb based on the following estimate equation (1) using multiple items of pixel data xi as the prediction tap and the coefficient data Wi:

$$y = \sum_{i=1}^{n} Wi\, xi \qquad (1)$$

where n indicates numbers of the multiple items of pixel data xi as the prediction tap.

The coefficient seed data held on the above coefficient memory 83 is coefficient data of a productive equation for producing coefficient data Wi for the above estimate equation. The productive equation includes parameters r and z for adjusting image quality. A following equation (2) shows an example of the productive equation:

$$Wi = w_{i0} + w_{i1}r + w_{i2}z + w_{i3}r^2 + w_{i4}rz + w_{i5}z^2 + w_{i6}r^3 + w_{i7}r^2z + w_{i8}rz^2 + w_{i9}z^3 \qquad (2)$$

where Wij indicates the coefficient seed data. The parameter r is a parameter that is used for setting resolution. The parameter z is a parameter that is used for setting noise reduction level. The coefficient seed data Wij is information on conversion from the image signal Va (525$i$ signal) into the image signal Vb (1050$i$ signal).

If 525$i$ signal is converted into 1050$i$ signal as shown in FIG. 6, it is necessary to obtain four pixels of 1050$i$ signal relative to one pixel of 525$i$ signal in each of the odd fields and even fields.

FIG. 8 shows a phase lag of four pixels constituting 1050$i$ signal in a unit pixel block UB of 2*2 pixels in each of the odd and even fields behind a central prediction tap. If the odd field, positions of four pixels HD1 through HD4 in the unit pixel block UB are respectively shifted by certain intervals (k1 through k4 in a horizontal direction and m1 through m4 in a vertical direction) from a position SD0 of the central prediction tap. If the even field, positions of four pixels HD1' through HD4' in the unit pixel block UB are respectively shifted by certain intervals (k1' through k4' in a horizontal direction and m1' through m4' in a vertical direction) from a position SD0' of the central prediction tap.

Thus, the coefficient seed data Wij of each class as described above is composed of items of the coefficient seed data Wij each corresponding to eight species of output pixels (HD1 through HD4 and HD1' through HD4'). The coefficient memory 83 stores the coefficient seed data Wij for each combination of class and output pixel.

This coefficient seed data Wij has been previously produced by a learning of an image signal Vb', as a teacher signal, which corresponds to the image signal Vb, and an image signal Va', as a student signal, which corresponds to the image signal Va. How to calculate such the coefficient seed data Wij will be described more in detail later.

The coefficient-data-generating unit 215 acquires from the coefficient memory 83 items of the coefficient seed data Wij of four pixels, which correspond to the four output pixels (HD1 through HD4 and HD1' through HD4' shown in FIG. 8), respectively, of the class indicated by the class code CL that has been obtained in the class-detecting unit 214 in each of the odd and even fields. The coefficient-data-generating unit 215 then generates the coefficient data Wi of four pixels based on the above productive equation (2) using the parameters r and z for adjusting image quality, which are supplied from the controlling portion 204.

The values of the parameters r and z to be supplied from the controlling portion 204 to the coefficient-data-generating unit 215 are as follows. Namely, concerning a value of the parameter r, at any one of automatic mode and manual mode, it set to a value of resolution adjusted by user's manipulation. Concerning a value of the parameter z, at the automatic mode and manual mode, it is set as follows: at the automatic mode, it is set to a value of noise reduction level corresponding to the amount of noise, which is received from the information-acquiring unit 82, and at the manual mode, it is set to a value of noise reduction level that is adjusted by user's manipulation.

Although the resolution and noise reduction has been adjusted based on the user's manipulation, the controlling portion 204 obtains information on an adjustment region of the value of noise reduction level from the non-volatile memory 82a of the information-acquiring unit 82 via the bus 60 so that adjustment region of the value of the noise reduction level by the user can be restricted on the basis of the this information on the adjustment region. In this sense, the controlling portion 204 constitutes adjustment region restriction means.

The processing portion 202 additionally has an estimation/prediction calculation unit 217. This estimation/prediction calculation unit 217 calculates pixel data for each unit pixel block UB in which the target position of the image signal Vb stays. Namely, the estimation/prediction calculation unit 217 separately calculates items of the pixel data y1 through y4 of four pixels constituting this unit pixel block UB according to the above estimate equation (1) by using the pixel data xi of prediction tap, which corresponds to four pixels (target pixels) in the unit pixel block UB and is extracted by the prediction-tap-selecting unit 212 and the coefficient data Wi of four pixels, which corresponds to four pixels in the unit pixel block UB and is generated in the coefficient-data-generating unit 215.

The processing portion 202 further has a post-processing unit 218. The post-processing unit 218 linear-serializes the items of pixel data $y_1$ through $y_4$, of four pixels in the unit pixel block UB, which are serially transmitted from the estimation/prediction calculation unit 217 and outputs them as 1050i signal.

The following will describe operations of the image-quality-altering unit 63A shown in FIG. 5.

The receiving terminal 201 receives the image signal Va having SD format. The buffer memory 211 then temporarily stores the image signal Va. Based on the image signal Va, any classification adaptation processing is performed to generate each of the items of pixel data constituting the image signal Vb.

Namely, the class-tap-selecting unit 213 selectively extracts multiple items of the pixel data, as class tap data, which are positioned around the target position in the image signal Vb, based on the image signal Va stored on the buffer memory 211. These items of pixel data are supplied to the class-detecting unit 214.

The class-detecting unit 214 performs data-compression processing of, for example, one-bit ADRC on the items of the pixel data as the class tap data to obtain the class code CL indicating a class to which the pixel data of the target position in the image signal Vb belongs. This class code CL is supplied to the coefficient-data-generating unit 215.

This coefficient-data-generating unit 215 acquires from the coefficient memory 83 the coefficient seed data Wij (wi0 through wi9 in this embodiment) of four pixels, which respectively correspond to the four output pixels (HD1 trough HD4 and HD1' trough HD4' shown in FIG. 8) of the class indicated by the class code CL in each of the odd and even fields. The coefficient-data-generating unit 215 also receives the parameters, r and z, for adjusting image quality from the controlling portion 204. The coefficient-data-generating unit 215 then generates the coefficient data Wi of four output pixels based on the above productive equation (2) using values of the coefficient seed data, wi0 through wi9, of four pixels and the parameters r and z for adjusting image quality, in each field. This coefficient data Wi is supplied to the estimation/prediction calculation unit 217.

The prediction-tap-selecting unit 212 selectively extracts multiple items of the pixel data xi, which are positioned around the target position in the image signal Vb, as the prediction tap data, based on the image signal Va stored in the buffer memory 211. The items of the pixel data xi are also supplied to the estimation/prediction calculation unit 217.

The estimation/prediction calculation unit 217 separately calculates items of the pixel data, y1 through y4, of four pixel (relative to the target position) in the unit pixel block UB in which the target position of the image signal Vb stays based on the above estimate equation (1) using the multiple items of pixel data xi extracted in the prediction-tap-selecting unit 212 as the prediction tape data and the coefficient data Wi of four output pixels that is generated in the coefficient-data-generating unit 215.

The items of the pixel data, y1 through y4, of four pixels in each unit pixel block UB constituting the image signal Vb are serially transmitted from the estimation/prediction calculation unit 217 and supplied to the post-processing unit 218. This post-processing unit 218 linear-serializes the items of pixel data, $y_1$ through $y_4$, of four pixels in the unit pixel block UB, which are serially supplied from the estimation/prediction calculation unit 217 and outputs them as 1050i signal. Thus, the post-processing unit 218 can obtain the image signal Vb (1050i signal) and this image signal Vb is output through the transmitting terminal 203.

Figure 9:
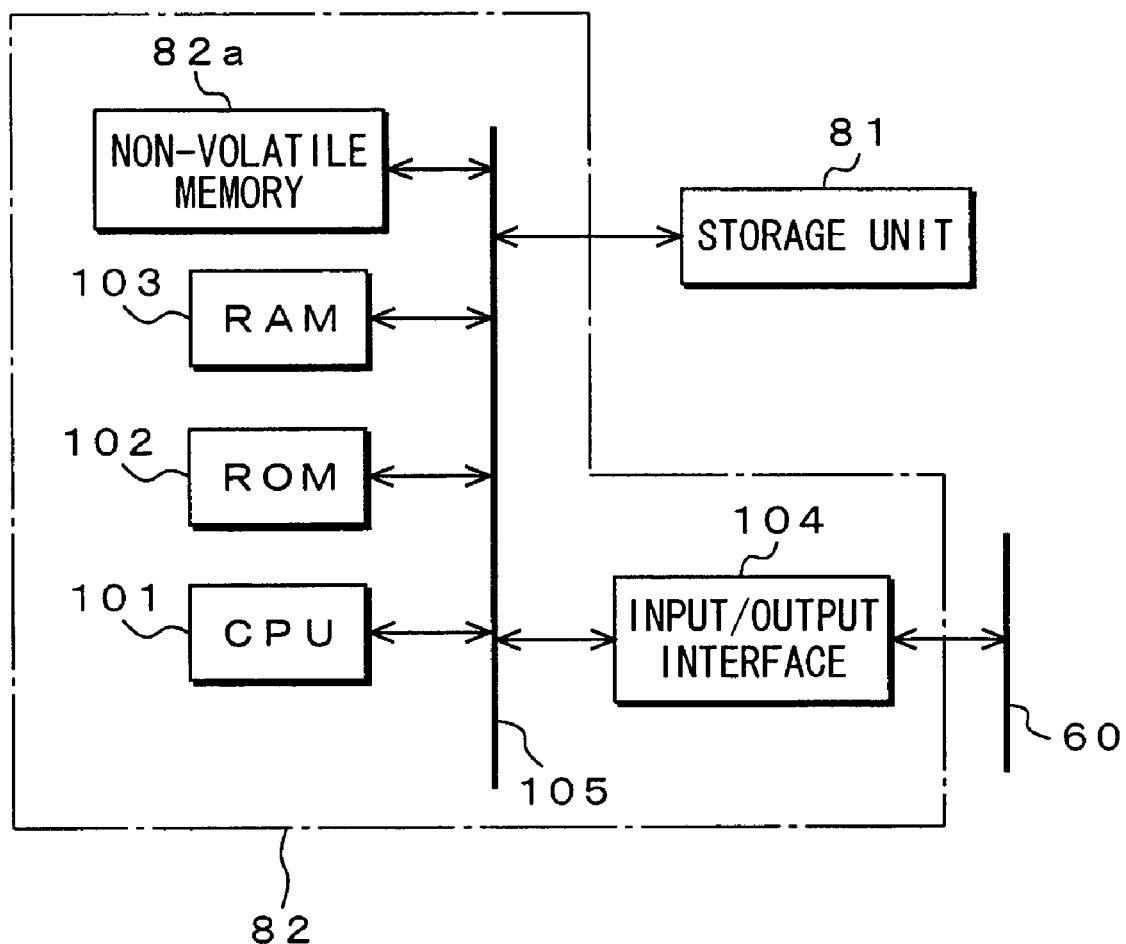
FIG. 9 is a block diagram for showing a configuration of an embodiment of an information-acquiring unit of the removable substrate.

FIG. 9 shows a configuration of the information-acquiring unit 82 of the removable substrate 70. This information-acquiring unit 82 has CPU 101, ROM 102, RAM 103, the non-volatile memory 82a, and an input/output interface 104, which are connected to each other via a bus 105. The ROM 102 stores operation programs of the CPU 101 or the like. The RAM 103 is composed of a working area for the CPU 101. The non-volatile memory 82a stores adjustment information on the value of noise reduction level, as described above. The input/output interface 104 performs input/output interface processing from and to the bus 60.

The following will describe operations of the image-processing apparatus 51 shown in FIG. 1.

When the user manipulates the remote controller to command a reception of, for example, television broadcast signal of desired channel, the light-receiving unit 67 receives the infrared signal corresponding to this command and the signal corresponding to it is then supplied to the controlling unit 68. Based on this signal, the controlling unit 68 transmits to the television tuner 61 via the bus 60 a control command for commanding the television tuner 61 to receive the broadcast signal of the desired channel. When receiving this control command, the television tuner 61 receives the broadcast signal of the desired channel and de-modulates it to transmit the image signal and the audio signal thereof to the input-switching unit 62. Since the controlling unit 68 has received the control command for commanding the television tuner 61 to receive the broadcast signal, the controlling unit 68 also transmits a control command for selecting output of the television tuner 61 to the input-switching unit 62 via the bus 60. Based on this control command, the input-switching unit 62 selects the image signal and the audio signal that are supplied from the television tuner 61, and the selected image signal is supplied to the image-quality-altering unit 63A as well as the selected audio signal is supplied to the sound-quality-setting unit 65. The image-quality-altering unit 63A performs prescribed resolution creation processing of a value of the resolution and a value of the noise reduction level on the received image signal and transmits the processed image signal to the image-quality-setting unit 64.

The image-quality-setting unit 64 adjusts and sets brightness and hue of the image signal received from the image-quality-altering unit 63A to their specified values based on the control command received from the controlling unit 68 via the bus 60 and transmits the adjusted and set image signal to the monitor 66. The sound-quality-setting unit 65 adjusts and sets sound quality of the audio signal received from the input-switching unit 62 based on the control command received from the controlling unit 68 via the bus 60 and transmits the adjusted and set audio signal to the monitor 66. Thus, from the monitor 66, the image and audio of the television broadcast of the specified channel is output.

The following will describe operations of the resolution creation processing in the image-quality-altering unit 63A in more detail.

The image signal transmitted from the input-switching unit 62 is also supplied to the noise-amount-detecting unit 63B where an amount of noise contained in the image signal can be detected. The noise-amount-detecting unit 63B dispatches this amount of noise ND detected therein to the bus 60.

If the manual mode is set, a user can manipulate the remote controller to adjust a value of the resolution and a value of the noise reduction level. In this case, the controlling unit 68 controls the image-quality-altering unit 63A through the bus 60. Based on such the control, the image-quality-altering unit 63A performs the resolution creation processing that satisfies the adjusted value of the resolution and the adjusted value of the noise reduction level. Thereby, the monitor 66 can display an image that has been processed according to the resolution creation processing based on the value of the resolution and the value of the noise reduction level, which are adjusted by the user.

In this case, in the image-quality-altering unit 63A, the adjustment region of the value of noise reduction level is restricted based on the information on the adjustment region of the value of noise reduction level stored in the non-volatile memory 82a that the information-acquiring unit 82 of the removable substrate 70 has. If the non-volatile memory 82a of the information-acquiring unit 82 stores the information on the adjustment region of the value of noise reduction level that is suited to user's usage environment or user's preference, the user can easily and surely adjust the value of noise reduction level to one that is suited to user's usage environment or user's preference.

If the automatic mode is set, the user can manipulate the remote controller to adjust a value of the resolution. In this case, the controlling unit 68 also controls the image-quality-altering unit 63A through the bus 60. Based on such the control, the image-quality-altering unit 63A performs the resolution creation processing that satisfies the adjusted value of the resolution. Thereby, the monitor 66 can display an image that has been processed according to the resolution creation processing based on the value of the resolution, which is adjusted by the user.

When the automatic mode is set, the value of noise reduction level in the image-quality-altering unit 63A is set to the one corresponding to the amount of noise ND detected in the noise-amount-detecting unit 63B based on the information on correspondence between the amount of noise and the value of noise reduction level, which is stored in the non-volatile memory 82a. Thereby, the monitor 66 can display an image that has been processed according to the resolution creation processing based on the value of the noise reduction level, which corresponds to the amount of noise contained in the image signal.

If the non-volatile memory 82a of the information-acquiring unit 82 stores the information on correspondence between the amount of noise and the value of noise reduction level, which is suited to the user's usage environment or the user's preference, the value of noise reduction level can be automatically adjusted so as to be suited to the user's usage environment or the user's preference. Namely, in this case, an image having a value of noise reduction level that is suited to the user's usage environment or the user's preference can be acquired without the user bothering to do so.

In the removable substrate 70, the information-acquiring unit 82 acquires from the bus 60 an amount of noise for every frame or paired data of data on a value of the noise reduction level and data on an amount of noise for every time when the value of the noise reduction level is adjusted at the manual mode and the storage unit 81 sequentially stores it (see FIGS. 3 and 4).

Figure 10:
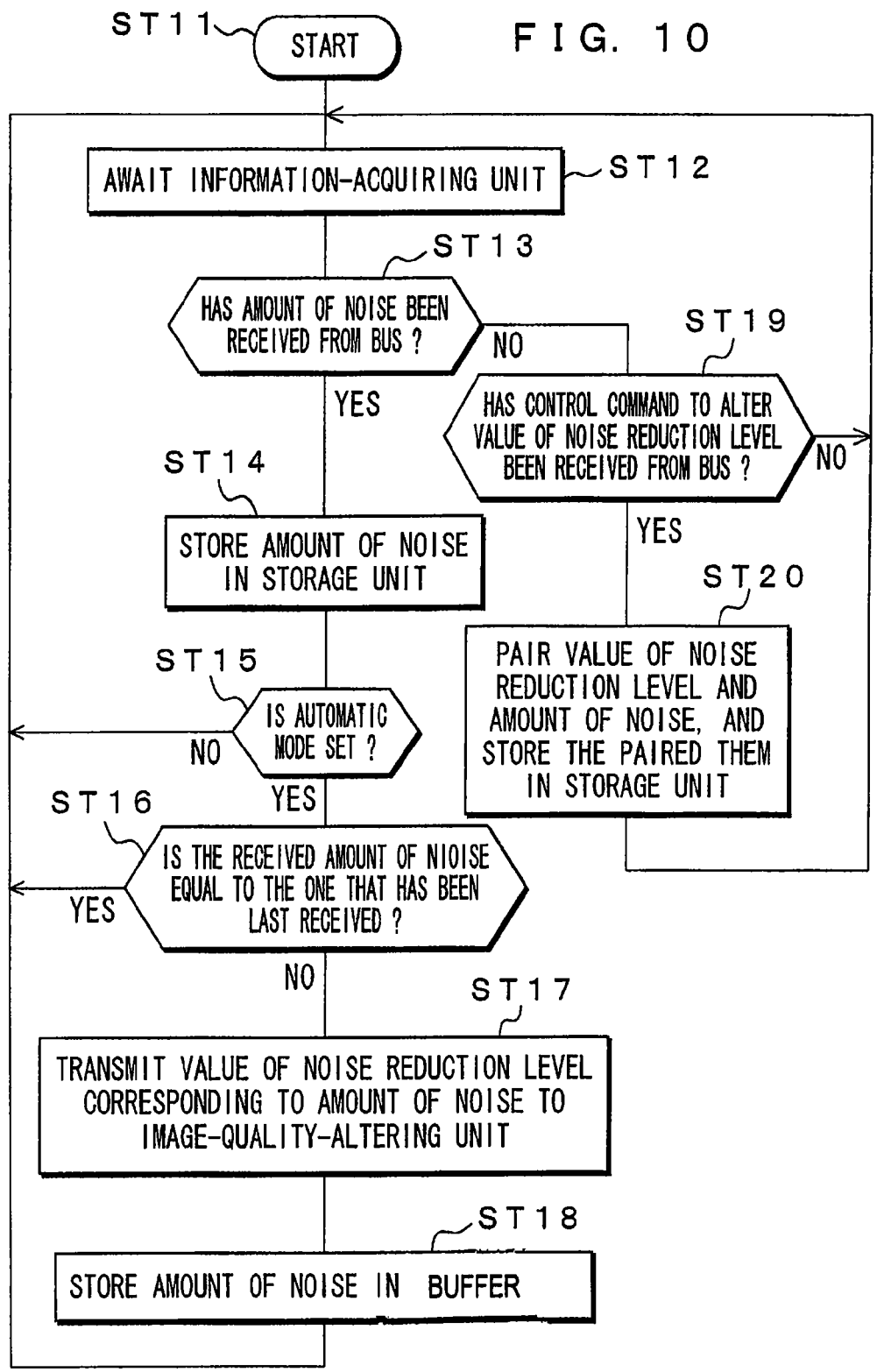
FIG. 10 is a flowchart for showing control operations of an embodiment of the information-acquiring unit.

FIG. 10 is a flowchart for showing control operations of an embodiment of the information-acquiring unit 82.

At step ST11, the process starts. At step ST12, the information-acquiring unit 82 is awaited and the process goes to step ST13 where it is determine whether an amount of noise has been received from the noise-amount-detecting unit 63B through the bus 60. If received, the process goes to the step ST14 where the storage unit 81 stores the amount of noise.

At step ST 15, it is determine whether an automatic mode is set. If no automatic mode is set, the process goes back to step ST12 where the information-acquiring unit 82 is awaited. If the automatic mode is set, it is determined whether the received amount of noise is equal to the one that has been last received at step ST 16. This determination is carried out by comparing the received mount of noise with the amount of noise that has been stored in the buffer (set in the RAM 103).

If the received amount of noise is equal thereto, the process goes back to step ST12 where the information-acquiring unit 82 is awaited. If the received amount of noise is not equal thereto, the process goes to step ST17. At the step ST17, a value of noise reduction level corresponding to the amount of noise received at the step ST13 is acquired based on the information on correspondence between the amount of noise and the value of noise reduction level, which is stored in the non-volatile memory 82a, and this acquired value of noise reduction level is transmitted to the image-quality-altering unit 63A. At step ST18, the buffer stores this amount of noise in order to use it at the step ST16 and the process goes back to step ST12 where the information-acquiring unit 82 is awaited.

If an amount of noise has not been received at step ST13, the process goes to step ST19 where it is determined whether a control command to alter the value of noise reduction level has been received from the bus 60. If not received, the process goes back to step ST12 where the information-acquiring unit 82 is awaited. If received, the process goes to step ST20 where the value of noise reduction level is paired with the amount of received noise. For example, the received noise stored in the buffer and the noise reduction level are stored in the storage unit 81 as paired data. The process then goes back to the step ST12 where the information-acquiring unit 82 is awaited.

Figure 11:
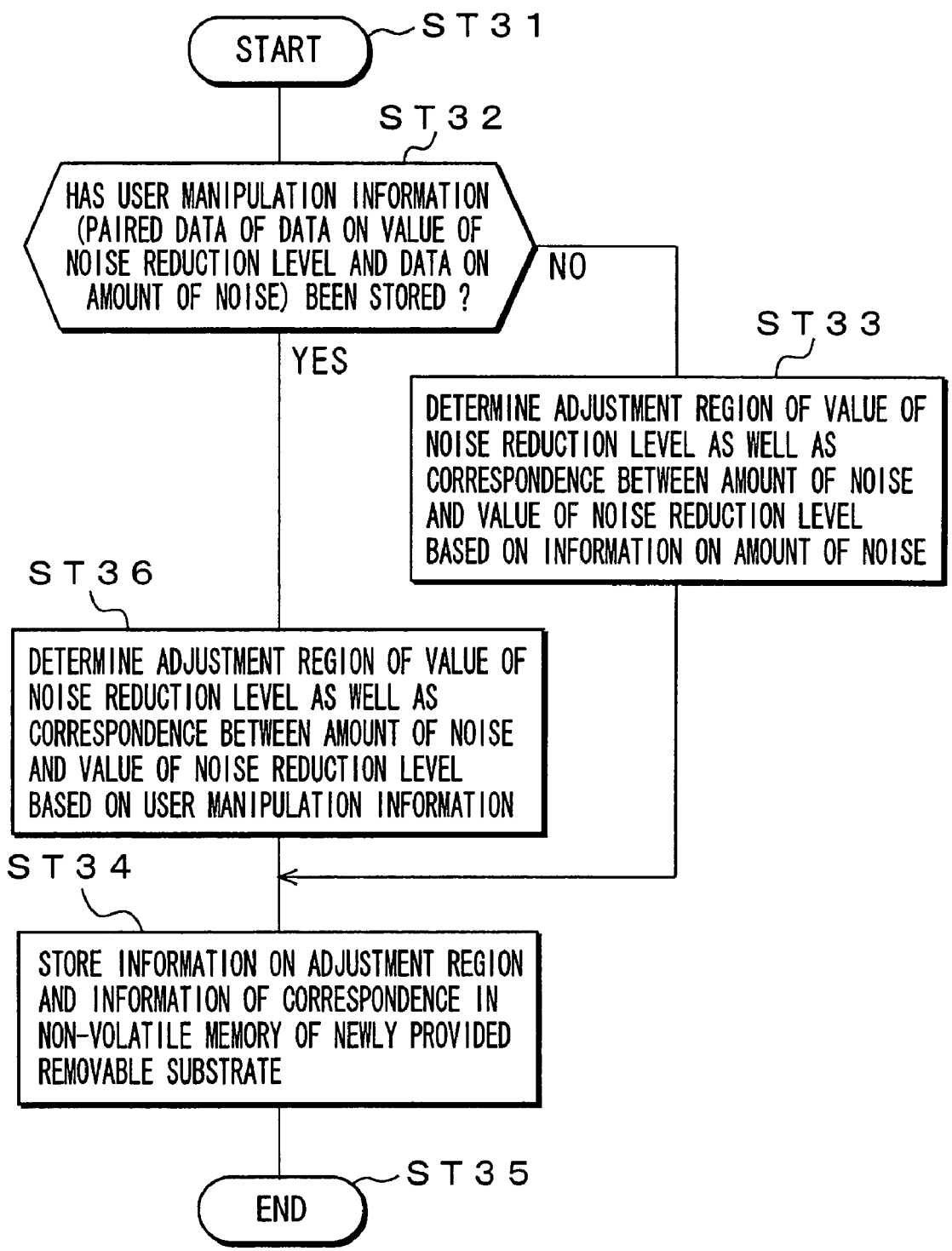
FIG. 11 is a flowchart for showing any processing in collected removable substrate.

The following will describe any processing after the removable substrate 70 is collected. FIG. 11 is a flowchart for showing any processing in the collected removable substrate 70.

First, at step ST31, the process starts and at step ST32, it is determined whether the storage unit 81 has stored user manipulation information, namely, the paired data of data on the value of noise reduction level and data on the amount of noise. At the step ST32, if the storage unit 81 has not stored the user manipulation information, the process goes to step ST33 where an adjustment region of the value of noise reduction level and the correspondence between the value of noise reduction level and the amount of noise are determined based on information on the amount of noise stored in the storage unit 81.

Next, at step ST34, information on adjustment region of the value of noise reduction level and information on the correspondence between the value of noise reduction level and the amount of noise are stored in the non-volatile memory 82*a* that the information-acquiring unit 82 of a newly provided removable substrate, which has the same configuration as that of the collected removable substrate 70, has. The process then goes to step ST35 where it finishes.

If the storage unit 81 has stored the user manipulation information, the process goes to step ST36. At step ST36, based on the user manipulation information, the adjustment region of the value of noise reduction level and the correspondence between the value of noise reduction level and the amount of noise are set. At step ST34, information on adjustment region of the value of noise reduction level and information on the correspondence between the value of noise reduction level and the amount of noise is stored in the non-volatile memory 82*a* that the information-acquiring unit 82 of a newly provided removable substrate, which has the same configuration as that of the collected removable substrate 70, has. The process then goes to step ST35 where it finishes.

It is to be noted that as the newly provided removable substrate, the collected removable substrate 70 can be used as it is as well as a removable substrate that is other than the collected removable substrate 70 can be also used. In any event, the corresponding removable substrate constitutes the removable substrate newly provided.

The following will describe how to acquire the correspondence between the value of noise reduction level and the amount of noise at step ST36.

Figure 12A:
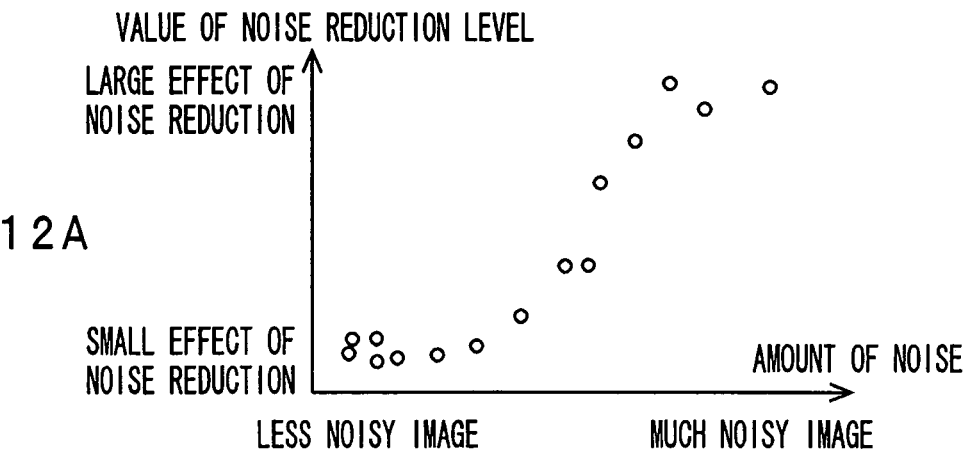
FIGS. 12A through 12C are graphs each for showing an example of distribution of the paired data relative to data on a value of noise reduction level and data on an amount of noise.
Figure 12B:
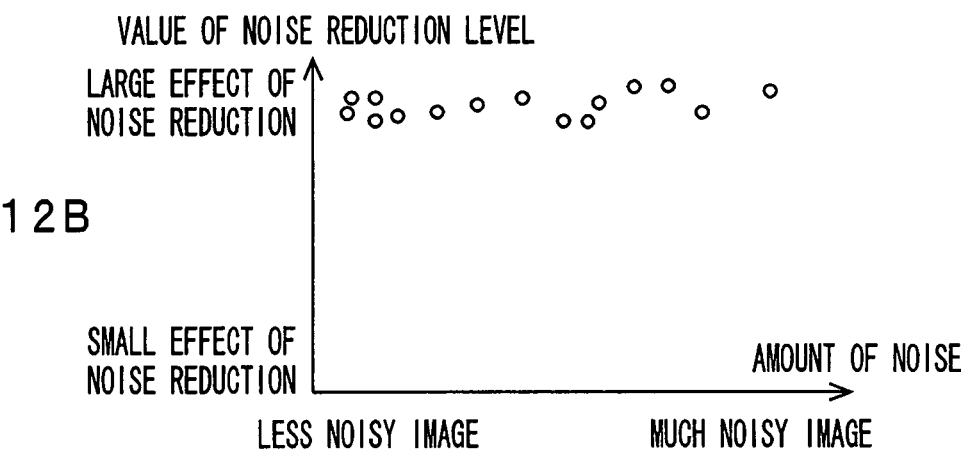
Figure 12C:
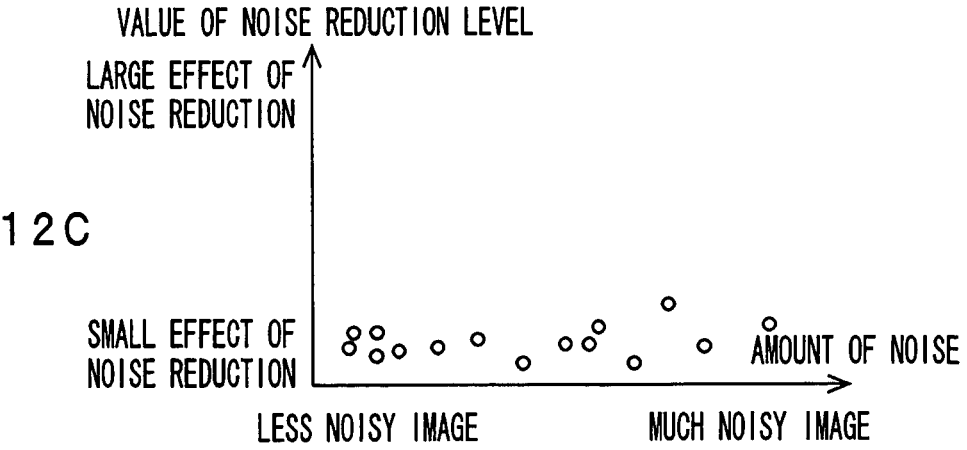

FIGS. 12A through 12C are graphs each for showing a typical example of distribution of the paired data relative to data on a value of noise reduction level and data on an amount of noise, which are stored in the storage unit 81. In these figures, each circular mark represents position of distribution of the paired data.

In the example of distribution shown in FIG. 12A, it is understood that a user sets a value of noise reduction level to become smaller in an image in which little noise is included so that a small effect of noise reduction is acquired but he or she sets a value of noise reduction level to become larger in an image in which much noise is included so that a large effect of noise reduction is acquired. In the example of distribution shown in FIG. 12B, it is understood that a user sets a value of noise reduction level to become larger so that a large effect of noise reduction is acquired, which is irrelevant to an amount of noise. In the example of distribution shown in FIG. 12C, it is understood that a user sets a value of noise reduction level to become smaller so that a small effect of noise reduction is acquired, which is irrelevant to an amount of noise.

Figure 13A:
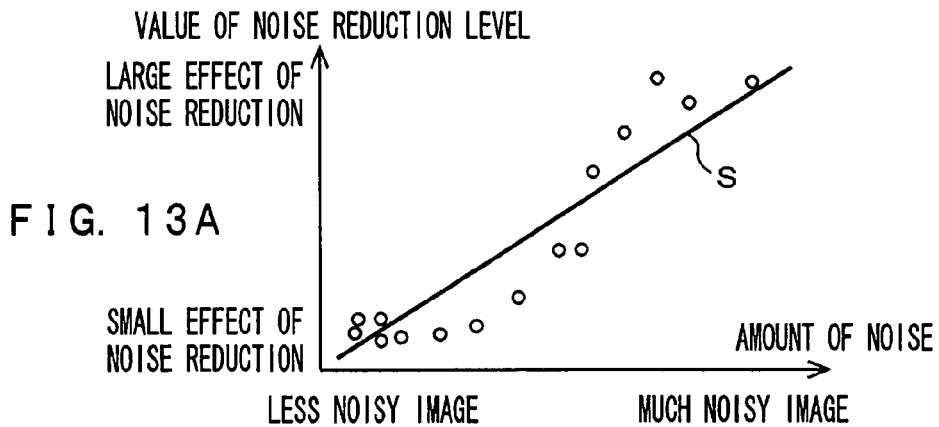
FIGS. 13A through 13C are graphs each for showing how to calculate correspondence between a value of noise reduction level and an amount of noise.

The correspondence between the value of noise reduction level and the amount of noise can be calculated by using multiple items of the paired data relative to data on a value of noise reduction level and data on an amount of noise, for example, as follows:

(1) Calculation Method 1;

As shown in FIG. 13A, using the multiple items of the paired data, a primary approximating line S for indicating the correspondence between the value of noise reduction level and the amount of noise is determined. If the primary approximating line S is given in the form y=ax+b, a slope "a" and an intercept "b" are respectively calculated using the following equations (3) and (4).

$$a = \frac{n\sum X_i Y_i - \sum X_i \sum Y_i}{n\sum X_i^2 - (\sum X_i)^2} \quad (3)$$

-continued $$b = \frac{\sum X_i^2 \sum Y_i - \sum X_i \sum X_i Y_i}{n\sum X_i^2 - (\sum X_i)^2} \quad (4)$$

where n represents the number of items of the paired data to be used, Xi represents an amount of noise contained in "i"th item of the paired data, and Yi represents a value of noise reduction level in "i"th item of the paired data.

FIG. 14 is a flowchart for showing any processing of this calculation method 1. First, at step ST41, the process starts and at step ST42, a slope "a" of the prediction equation (an equation of the primary approximating line S) is calculated by using the multiple items of the paired data. Next, at step ST43, an intercept "b" of the prediction equation is calculated by using the multiple items of the paired data. At step ST44, the prediction equation (the correspondence between the value of noise reduction level and the amount of noise) is determined by using the slope "a" and the intercept "b", which has been calculated at the steps ST42 and ST43. The process then goes to step ST45 where it finishes.

Figure 13B:
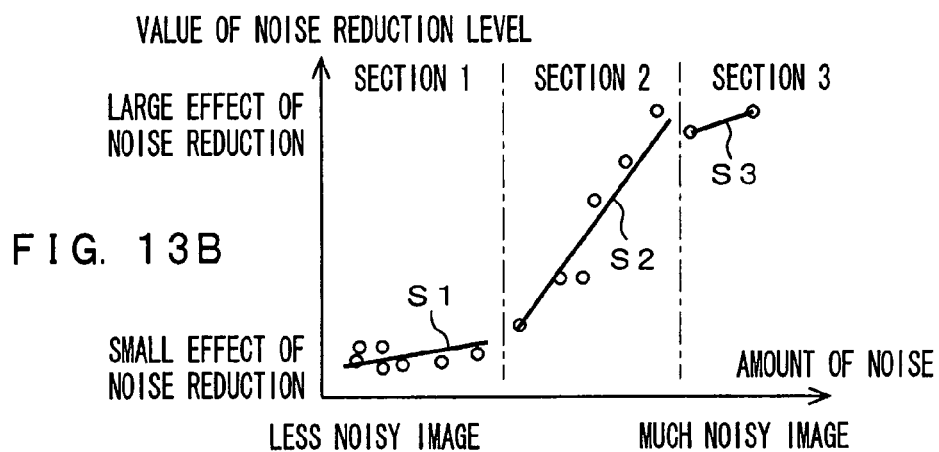

(2) Calculation Method 2;

As shown in FIG. 13B, an axis of the amount of noise is divided into plural sections and a primary approximating line indicating the correspondence between the value of noise reduction level and the amount of noise is determined for every section. The determination method of the primary approximating line in each section is similar to that of the above calculation method 1 and is carried out by using the multiple items of the paired data that are distributed in the section. In FIG. 13B, an axis of the amount of noise is divided into three sections, first, second, and third sections, and in respective sections, primary approximating lines S1, S2, and S3 are determined.

FIG. 15 is a flowchart for showing any processing of this calculation method 2. First, at step ST51, the process starts and at step ST52, it is determined whether all of the combinations of the divided number relative to division of the axis of the amount of noise and its divided position have been completed. If all of the combinations have been not completed, the process goes to step ST53 where combination of the divided number relative to division of the axis of the amount of noise and its divided position is set.

Next, at step ST54, multiple items of the paired data are separated into each section relative to the set combination. At step ST55, for every section, the prediction equation (an equation of the primary approximating line) is determined by using multiple items of the paired data distributed in the corresponding section.

At step ST56, for every section, a prediction error in the prediction equation determined at the step ST55 is calculated by using multiple items of the paired data distributed in the corresponding section. For example, if m items of the paired data are distributed in a given section, the prediction error in the given section is calculated by multiplying the corresponding m items of the paired data by the respective prediction error corresponding thereto. If Xi represents an amount of noise contained in a given "i"th item of the paired data, Yi represents a value of noise reduction level in a given "i"th item of the paired data, and Yo represents a value of noise reduction level corresponding to the amount of noise Xi by the prediction equation, the prediction error corresponding to a given item of the paired data is calculated as |Yo−Yi|.

Next, at step ST57, a total prediction error that is a sum of prediction errors in every section is calculated. At step ST58, it is determined whether the total prediction error is minimum one. How to determinate whether the total prediction error is minimum one is performed by comparing it with the stored minimum total prediction error. It is to be noted that on the processing of first combination, such the comparison is not performed and a total prediction error is estimated as its minimum one.

If the total prediction error is not minimum one, the process goes back to the step ST52 where the following processing of the combination starts. If the total prediction error is minimum one, the process goes to step ST59 where the total prediction error calculated at the step ST57 is stored as its minimum one. At step ST60, information on the combination (of the divided number and the divided position) and the prediction equation of each section are stored. The process then goes back to the step ST52 where the following processing of the combination starts.

If all of the combinations have been completed at the step ST52, the process goes to step ST61. At the step ST61, the stored information on the combination and the stored prediction equation of each section are output and the process goes to step ST62 where it finishes.

Figure 13C:
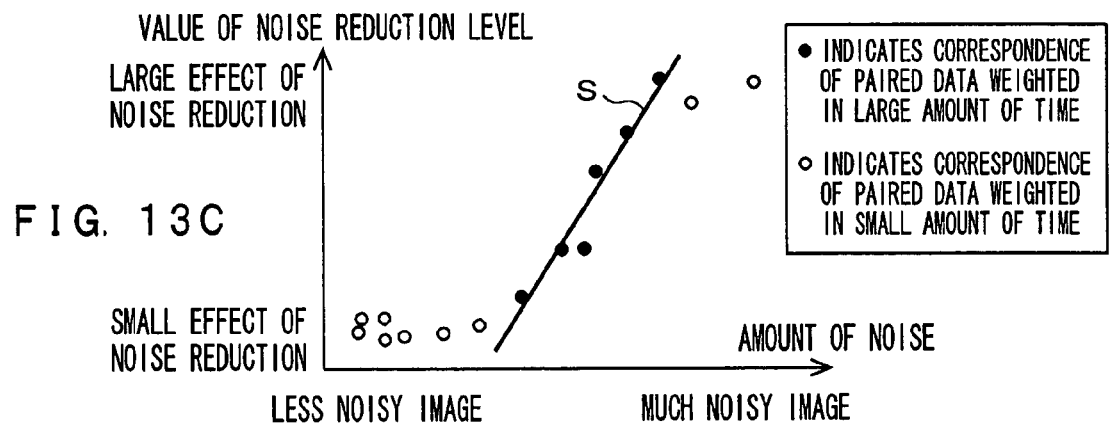

(3) Calculation Method 3;

As shown in FIG. 13C, a primary approximating line S indicating the correspondence between the value of noise reduction level and the amount of noise is determined by using multiple items of the paired data while each of the items of the paired data is weighted by their stored period of time. In this figure, the paired data indicated as a black circle is stored for a relative short time so that it is weighted in large amount thereof while the paired data indicated as a white circle is stored for a relative long time so that it is weighted in small amount thereof. The determination method of the primary approximating line S is similar to that of the above calculation method 1.

FIG. 16 is a flowchart for showing any processing of this calculation method 3. First, at step ST71, the process starts and at step ST72, according to information on a period of stored time, a number of additions of the paired data is determined. For example, if the paired data is stored for a relative short time, many times of additions are carried out so that it is weighted in large amount thereof. On the other hand, if the paired data is stored for a relative long time, fewer times of addition are carried out so that it is weighted in small amount thereof.

Next, at step ST73, a slope "a" of the prediction equation (an equation of the primary approximating line) is calculated by using the multiple items of the paired data. At step ST 74, an intercept "b" of the prediction equation is then calculated by using the multiple items of the paired data. At step ST75, the prediction equation (the correspondence between the value of noise reduction level and the amount of noise) is determined by using the slope "a" and the intercept "b", which has been calculated at the steps ST73 and ST74. The process then goes to step ST76 where it finishes.

The following will describe how to calculate adjustment region of the value of noise reduction level in the step ST36 shown in FIG. 11.

Figure 17A:
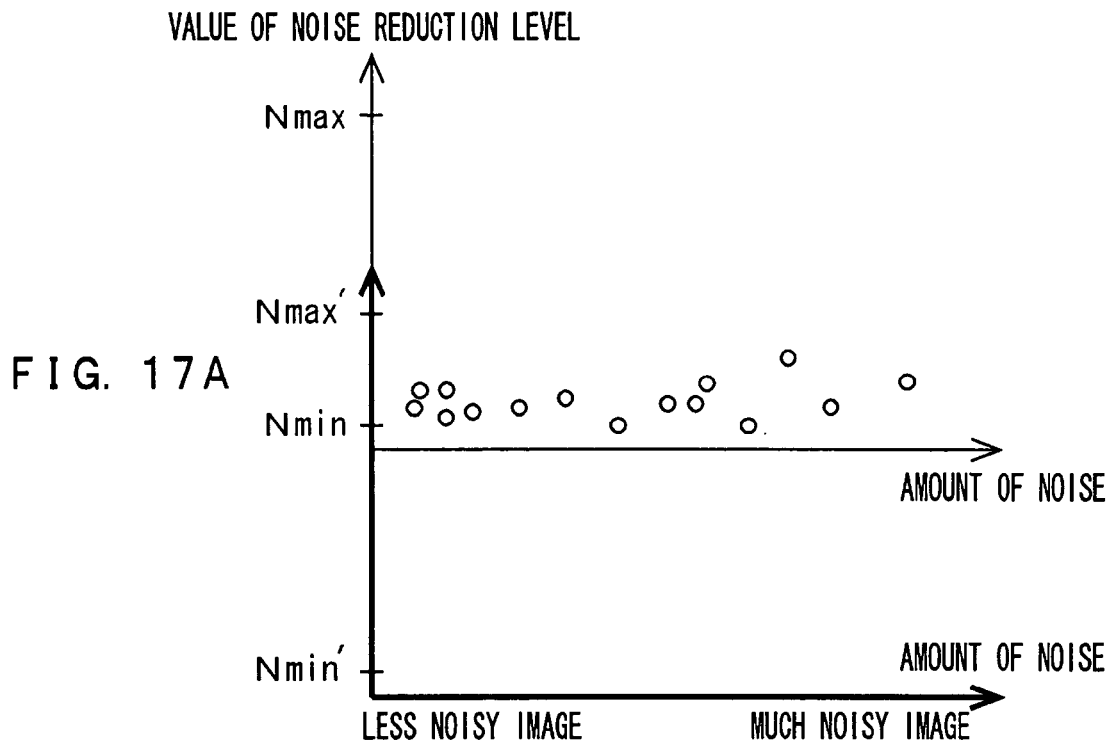
FIGS. 17A and 17B are graphs each for showing how to calculate adjustment region of the value of noise reduction level.

It is supposed that as shown in FIG. 17A, an adjustment region of the value of noise reduction level at present state stands within a region between Nmin to Nmax and values of noise reduction level in the multiple items of the paired data are inclined toward a side of Nmin. In the figure, white circles represent distributed positions of items of each paired data.

In this example, a user has a low sensitivity relative to noise so that he or she is not very concerned with such noise. The user tends to adjust the values of noise reduction level so as to make an effect of noise reduction smaller even if a very noisy image is presented. Thus, it is estimated that in such a case, the user fails to adjust the value of noise reduction level to the one that is suited to user's preference if a less noisy image is presented.

Therefore, in this case, the adjustment region of the value of noise reduction level is shifted downwardly as a whole, as shown in FIG. 17A, for example, to a region between Nmin' and Nmax'. This allows the user to adjust the value of noise reduction level so as to make its value smaller than the present value and to adjust the value of noise reduction level to the one that is suited to user's preference if the less noisy image is presented.

Figure 17B:
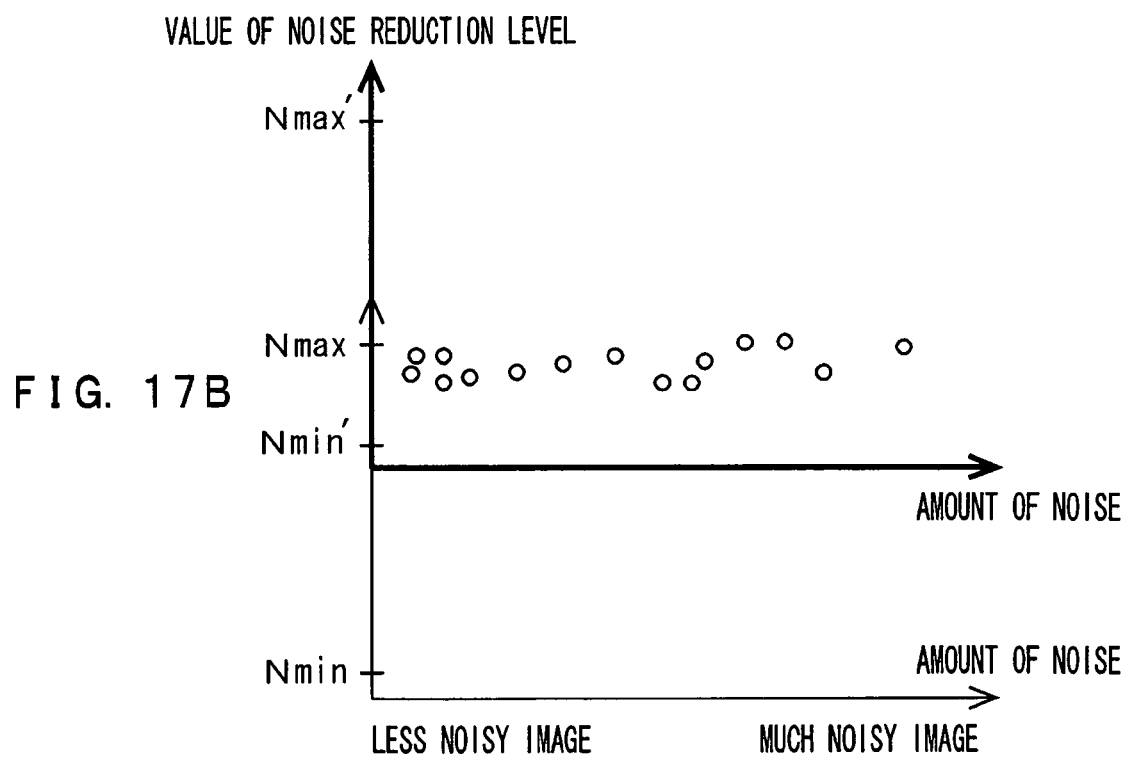

It is supposed that as shown in FIG. 17B, an adjustment region of the value of noise reduction level at present state stands within a region between Nmin to Nmax and values of noise reduction level in the multiple items of the paired data are inclined toward a side of Nmax. In the figure, white circles represent distributed positions of items of the paired data.

In this case, a user has high sensitivity relative to noise so that he or she hates the noise. The user tends to adjust the values of noise reduction level so as to make an effect of noise reduction larger even if a less noisy image is presented. Thus, it is estimated that in such this case, the user fails to adjust the value of noise reduction level to the one that is suited to user's preference if a much noisy image is presented.

Therefore, in this case, the adjustment region of the value of noise reduction level is shifted upwardly as a whole, as shown in FIG. 17B, for example, to a region between Nmin' and Nmax'. This allows he user to adjust the value of noise reduction level so as to make its value larger than the present value and to adjust the value of noise reduction level to the one that is suited to user's preference if the much noisy image is presented.

Figure 18:
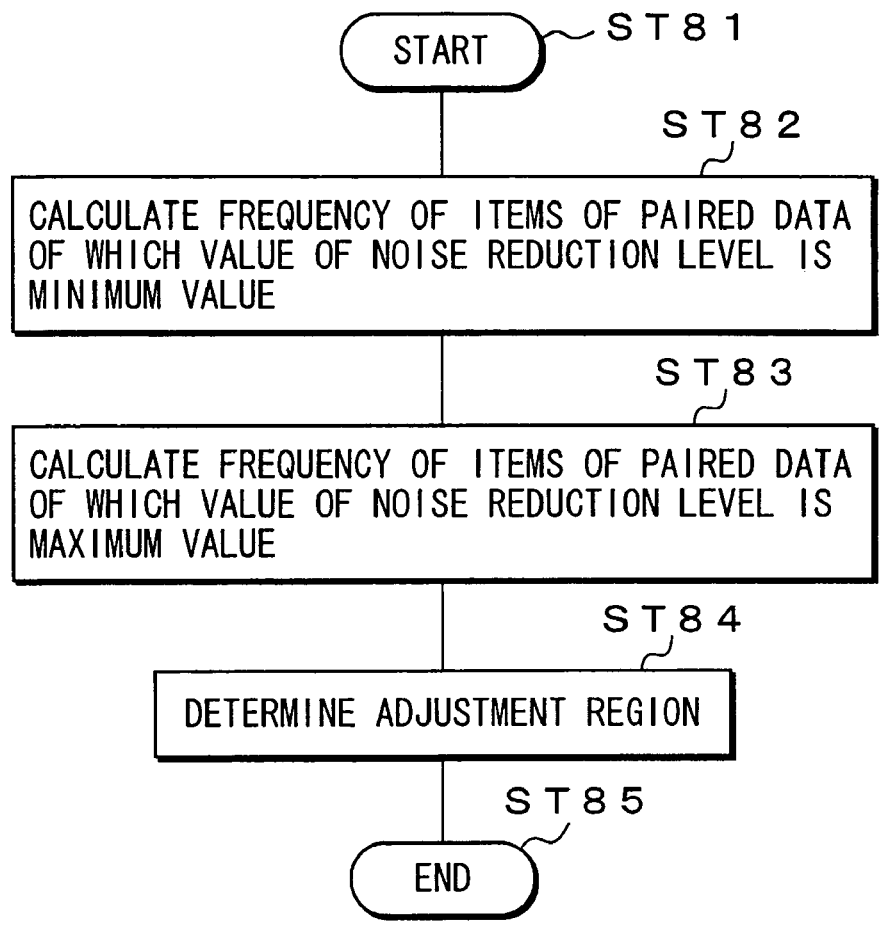
FIG. 18 is a flowchart for determination processing of the adjustment region of the value of noise reduction level.

FIG. 18 is a flowchart for determination processing of the adjustment region of the value of noise reduction level.

First, at step ST81, the process starts and at step ST82, a frequency (a number) of items of the paired data that its value of noise reduction level is minimum value Nmin is calculated. Next, at step ST83, a frequency (a number) of items of the paired data that its value of noise reduction level is maximum value Nmax is calculated. At step ST84, based on the frequencies calculated at the steps ST82 and ST83, the adjustment region of the value of noise reduction level is determined and the process goes to step ST85 where it finishes.

Figure 19A:
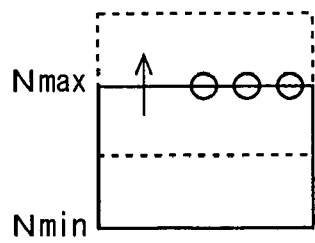
FIGS. 19A through 19C are diagrams each for showing an example of determination of the adjustment region.

For example, in the step ST84, as shown in FIG. 19A, if only items of the paired data in which the value of noise reduction level is maximum value Nmax are present, the adjustment region of the value of noise reduction level is shifted upwardly as a whole as shown by broken line and its shift amount is set to the one that is proportioned to the number of items of the paired data that is maximum value Nmax.

Figure 19B:
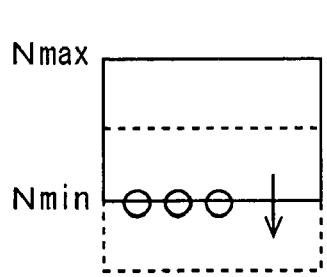

Alternatively, in the step ST84, as shown in FIG. 19B, if only items of the paired data in which the value of noise reduction level is minimum value Nmin are present, the adjustment region is shifted downwardly as a whole as shown by broken line and its shift amount is set to the one that is proportioned to the number of items of the paired data that is minimum value Nmin.

Figure 19C:
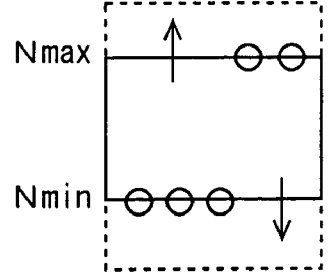

Further, in the step ST84, as shown in FIG. 19C, if both of items of the paired data in which the value of noise reduction level is maximum value Nmax and items of the paired data in which the value of noise reduction level is minimum value Nmin are present, the adjustment region is expanded upwardly and downwardly as shown by broken line. In this case, the upwardly expanded amount is set to the one that is proportioned to the number of items of the paired data that is maximum value Nmax and the downwardly expanded amount is set to the one that is proportioned to the number of items of the paired data that is minimum value Nmin.

It is to be noted that the larger adjusting step width of the value of noise reduction level is taken if the adjustment region is expanded as shown by broken line in FIG. 19C. If none of the paired data in which the value of noise reduction level is maximum value Nmax and the paired data in which the value of noise reduction level is minimum value Nmin is present, the adjustment region of the value of noise reduction level is not changed or the adjustment region is reduced. It is to be noted that the smaller adjusting step width of the value of noise reduction level is taken if the adjustment region is reduced.

Although the adjustment region of the value of noise reduction level has been determined based on the frequency of items of the paired data in which the value of noise reduction level is maximum value Nmax and the frequency of items of the paired data in which the value of noise reduction level is minimum value Nmin, it is possible to determine the adjustment region of the value of noise reduction level by calculating a weighted center of the values of the noise reduction levels in multiple items of the paired data and calculating the adjustment region based on the weighted center thereof. For example, the adjustment region of the value of noise reduction level is determined to a set region in which the calculated weighted center is an almost center thereof. If a weighted center of the values of the noise reduction levels in multiple items of the paired data is thus calculated, it is possible to use each of the values of noise reduction level that are weighted by a period of the stored time.

The following will describe how to produce items of the coefficient seed data, which are stored in the coefficient memory 83 of the removable substrate 70. These items of the coefficient seed data are generated by learning. It is assumed that items of the coefficient seed data $w_{i0}$ to $w_{i9}$, which are items of the coefficient data used in the productive equation as given in the equation (2), are generated.

For ease of explanation, tj (j=0 to 9) is defined as given in equation (5).

$$t_0=1, t_1=r, t_2=z, t_3=r^2, t_4=rz, t_5=z^2, t_6=r^3, t_7=r^2z,$$
$$t_8=rz^2, t_9=z^3 \quad (5)$$

By using this equation (5), the equation (2) is rewritten as equation (6).

$$Wi = \sum_{j=0}^{9} w_{ij} t_j \quad (6)$$

Finally, an undetermined coefficient $w_{ij}$ is obtained by the learning. That is, by using multiple items of learning data for each combination of class and output pixel, a coefficient value that minimizes a square error is determined. This solution employs a so-called least-squares method. Assuming the number of times of learning to be m, a remainder of the k'th item of learning data ($1 \leq k \leq m$) to be ek, and a total sum of the square errors to be E, E can be given by equation (7) based on the equations (1) and (2).

$$E = \sum_{k=1}^{m} e_k^2 \quad (7)$$

-continued $$= \sum_{k=1}^{m} [yk - (W_{1 \times 1k} + W_{2 \times 2k} + \ldots + W_{n \times nk})]^2$$

$$= \sum_{k=1}^{m} \{yk - [(t_0 w_{10} + t_1 w_{11} + \ldots + t_9 w_{19})x_{1k} + \ldots +$$

$$(t_0 w_{n0} + t_1 w_{n1} + \ldots + t_9 w_{n9})x_{nk}]\}^2$$

where $x_{ik}$ represents the k'th item of pixel data at the i'th prediction tap position of an SD signal and $y_k$ represents the corresponding k'th item of pixel data of an HD signal.

By the solution based on the least-squares method, such $w_{ij}$ is obtained that a partial differentiation by use of $w_{ij}$ in the equation (7) may be 0. This is indicated by following equation (8).

$$\frac{\partial E}{\partial wij} = \sum_{k=1}^{m} 2 \left( \frac{\partial ek}{\partial wij} \right) e_k = -\sum_{k=1}^{m} 2 t_j x_{ik} e_k = 0 \quad (8)$$

Similarly, by defining $X_{ipjq}$ and $Y_{ip}$ as following equations (9) and (10), the equation (8) can be rewritten as following equation (11) by using a matrix.

$$X_{ipjq} = \sum_{k=1}^{n} x_{ik} t_p x_{jk} t_q \quad (9)$$

$$Y_{ip} = \sum_{k=1}^{m} x_{ik} t_p x_{yk} \quad (10)$$

$$\begin{bmatrix} X_{1010} & X_{1011} & X_{1012} & \cdots & X_{1019} & X_{1020} & \cdots & X_{10n9} \\ X_{1110} & X_{1111} & X_{1112} & \cdots & X_{1119} & X_{1120} & \cdots & X_{11n9} \\ X_{1210} & X_{1211} & X_{1212} & \cdots & X_{1219} & X_{1220} & \cdots & X_{12n9} \\ \vdots & \vdots & \vdots & \ddots & \vdots & \vdots & \ddots & \vdots \\ X_{1910} & X_{1911} & X_{1912} & \cdots & X_{1919} & X_{1920} & \cdots & X_{19n9} \\ X_{2010} & X_{2011} & X_{2012} & \cdots & X_{2019} & X_{2020} & \cdots & X_{20n9} \\ \vdots & \vdots & \vdots & \ddots & \vdots & \vdots & \ddots & \vdots \\ X_{n910} & X_{n911} & X_{n912} & \cdots & X_{n919} & X_{n920} & \cdots & X_{n9n9} \end{bmatrix} \begin{bmatrix} w_{10} \\ w_{11} \\ w_{12} \\ \vdots \\ w_{19} \\ w_{20} \\ \vdots \\ w_{n9} \end{bmatrix} = \quad (11)$$

$$\begin{bmatrix} Y_{10} \\ Y_{11} \\ Y_{12} \\ \vdots \\ Y_{19} \\ Y_{20} \\ \vdots \\ Y_{n9} \end{bmatrix}$$

This equation (11) is a normal equation for calculating coefficient seed data, $w_{i0}$ to $w_{i9}$. By solving this normal equation by a generic solution such as a sweeping-out (Gauss-Jordan elimination) method, items of the coefficient seed data, $w_{i0}$ to $w_{i9}$ (i=1 to n) can be produced.

Figure 20:
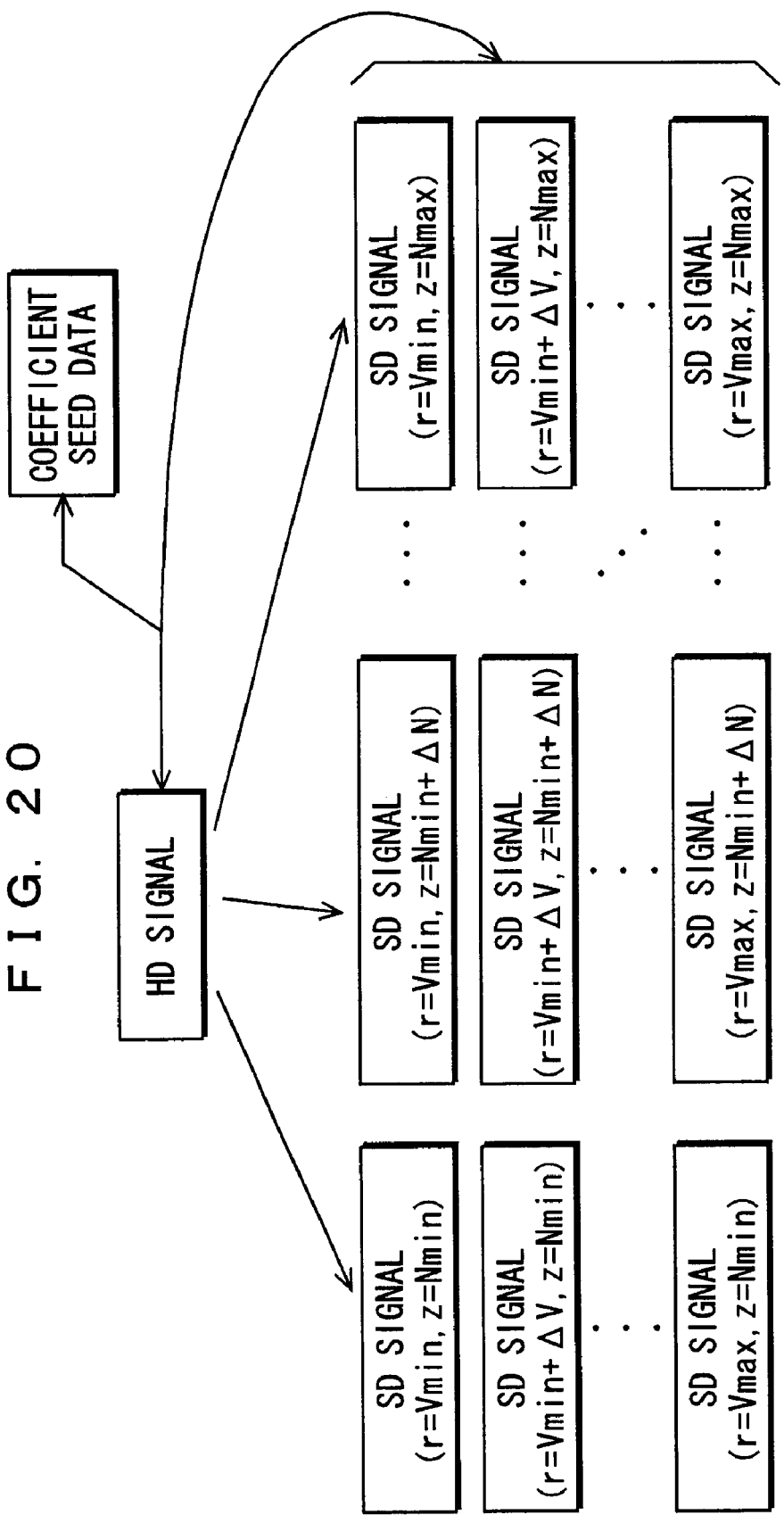
FIG. 20 is a diagram for illustrating how to generate coefficient seed data.

FIG. 20 shows a concept of the above-described coefficient seed data production method.

From an HD signal as a teacher signal, a plurality of SD signals as student signals is produced. It is to be noted that SD signals having different resolutions are produced by changing frequency characteristics of a thinning filter that is used when producing the SD signals from the HD signal.

By using the SD signals having different resolutions, items of the coefficient seed data having different resolution-improving effects can be produced. For example, assuming that there are an SD signal from which a more blurred image is obtained and an SD signal from which a less blurred image is obtained, coefficient seed data having larger resolution-improving effects is produced through learning by use of the SD signals each for the more blurred image, while coefficient seed data having smaller resolution-improving effects is produced through learning by use of the SD signals each for the less blurred image.

Further, by adding noise to each of the SD signals having different resolutions, noise-added SD signals are produced. By varying an amount of noise to be added, SD signals having different noise quantities added thereto are produced, thereby producing items of the coefficient seed data having different noise reduction effects. For example, assuming that there are an SD signal to which more noise is added and an SD signal to which less noise is added, coefficient seed data having larger noise reduction effect is produced through learning by use of the SD signals each having more noise added thereto, while coefficient seed data having smaller noise reduction effect is produced through learning by use of the SD signals each having less noise added thereto.

The amount of noise to be added is adjusted by varying a value of a variable G if, for example, as shown in the following equation (12), noise n multiplied by the variable G is added to a pixel value x of an SD signal to produce a pixel value x' of a noise-added SD signal.

$$x'=x+G\cdot n \tag{12}$$

For example, a parameter r for adjusting image quality that changes frequency characteristics is varied in plural steps at a set step of $\Delta V$ within a range from minimum value Vmin to maximum value Vmax in the adjustment region of the resolution and a parameter z for adjusting image quality that changes the amount of noise to be added is also varied in plural steps at a set step of $\Delta N$ within a range from minimum value Nmin to maximum value Nmax, thereby producing plural species of SD signals. Through learning between the SD signals thus produced and the HD signal, the coefficient seed data is produced. These parameters r and z correspond to the parameters r and z for adjusting image quality to be supplied to the coefficient-data-generating unit 215 of the image-quality-altering unit shown in FIG. 5.

Figure 21:
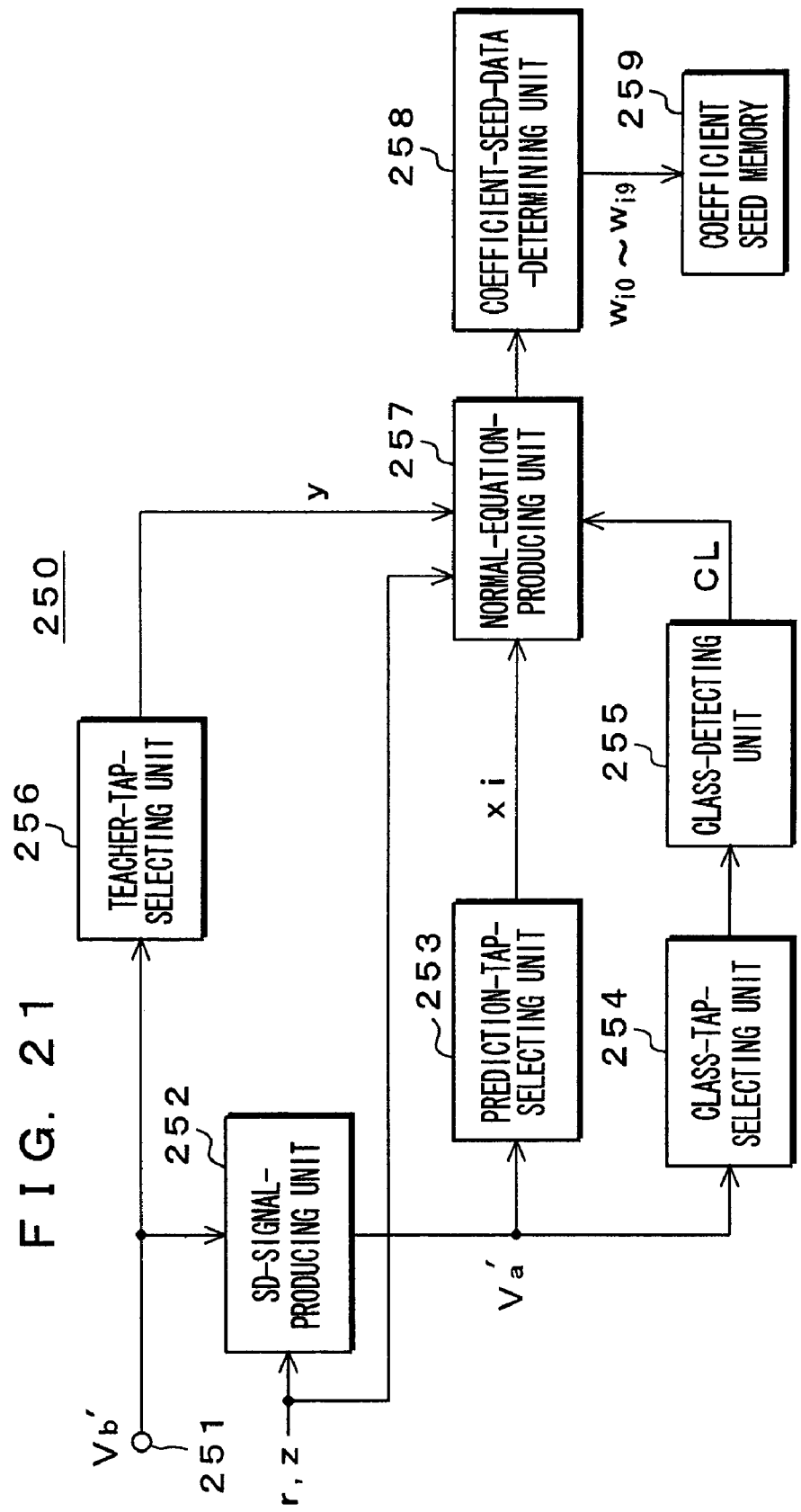
FIG. 21 is a block diagram for showing a configuration of an apparatus for generating the coefficient seed data.

The following will describe coefficient-seed-data-generating apparatus 250 that generates items of the above coefficient seed data, $w_{i0}$ to $w_{i9}$. FIG. 21 shows a configuration of the coefficient-seed-data-generating apparatus 250.

The coefficient-seed-data-generating apparatus 250 has a receiving terminal 251 and an SD-signal-producing unit 252. The receiving terminal 251 receives an image signal Vb' as the teacher signal, which corresponds to the above image signal Vb. The SD-signal-producing unit 252 produces an image signal Va' as a student signal, which corresponds to the above image signal Va, by performing horizontal and vertical thinning processing on this image signal Vb.' This SD-signal-producing unit 252 is supplied with the parameters r and z for adjusting the image quality. In accordance with the parameter r, frequency characteristics of the thinning filter used when the image signal Va' is produced from the image signal Vb' are varied. Further, in accordance with the parameter z, the amount of noise to be added to the image signal Va' is varied.

The coefficient-seed-data-generating apparatus 250 further has a prediction-tap-selecting unit 253 and a class-tap-selecting unit 254. These tap-selecting units 253 and 254 selectively extracts multiple items of the pixel data, as the prediction tap data and the class tap data, respectively, that are positioned around the target position in the image signal Vb' based on the image signal Va' produced in the SD-signal-producing unit 252. These tap-selecting units 253 and 254 respectively correspond to the tap-selecting units 212 and 213 of the above processing portion 202 (see FIG. 5).

The coefficient-seed-data-generating apparatus 250 additionally has a class-detecting unit 255. This class-detecting unit 255 performs data processing on the items of pixel data and the class tap data that are selectively extracted by the class-tap-selecting unit 254 to obtain a class code CL indicating a class to which pixel data of the target position in the image signal Vb' belongs. This class-detecting unit 255 corresponds to the class-detecting unit 214 of the above processing portion 202.

The coefficient-seed-data-generating apparatus 250 still further has a teacher-tap-selecting unit 256. This teacher-tap-selecting unit 256 selectively extracts the pixel data of the target position in the image signal Vb' from the image signal Vb'.

The coefficient-seed-data-generating apparatus 250 still additionally has a normal-equation-producing unit 257. This normal-equation-producing unit 257 produces the normal equation (see the equation (11)) for producing items of the coefficient seed data, $w_{i0}$ to $w_{i9}$, for each class from the pixel data y of each target position in the image signal Vb' that has been selectively extracted in the teacher-tap-selecting unit 256, multiple items of the pixel data xi as the prediction tap data that have been selectively extracted in the prediction-tap-selecting unit 253 respectively corresponding to the pixel data y of each of the target positions, the class codes CL that have been produced in the class-detecting unit 255 respectively corresponding to the pixel data y of each of the target positions, and values of the parameters r and z for adjusting image quality.

In relation to a pair of one item of pixel data y and multiple items of pixel data xi corresponding thereto, one item of learning data is produced. Many items of the learning data are produced for each class in relation to a pair of the image signal Vb' as the teacher signal and image signals Va' as the student signals corresponding thereto. This allows the normal equation for producing the coefficient seed data, $w_{i0}$ to $w_{i9}$, for each class to be produced in the normal-equation-producing unit 257.

In this case, in the normal-equation-producing unit 257, the normal equation is also produced for each of the output pixels (HD1 through HD4 and HD1' through HD4' shown in FIG. 8). Namely, the normal equations corresponding to these pixels, HD1 through HD4 and HD1' through HD4', are produced using items of the learning data that are composed of items of the pixel data y, lags from the center prediction tap SD0 or SD0' of which has the same relationship with those of the output pixels, HD1 through HD4 and HD1' through HD4'. After all, in the normal-equation-producing unit 257, the normal equation for producing the coefficient seed data, $w_{i0}$ to $w_{i9}$, is produced for each combination of the class and the output pixel.

The coefficient-seed-data-generating apparatus 250 further has a coefficient-seed-data-determining unit 258 and a coefficient seed memory 259. The coefficient-seed-data-determining unit 258 receives data of the normal equations from the normal-equation-producing unit 257 and then solves each of the normal equations by using the sweeping-out (Gauss-Jordan elimination) method or the like, in order to obtain the coefficient seed data, $w_{i0}$ to $w_{i9}$, for each combination of the class and the output pixel. The coefficient seed memory 259 then stores such the coefficient seed data, $w_{i0}$ to $w_{i9}$, thus obtained in the coefficient-seed-data-determining unit 258.

The following will describe operations of the coefficient-seed-data-generating apparatus 250 shown in FIG. 21.

At the receiving terminal 251, the image signal Vb' as the teacher signal is supplied. Then, this image signal Vb' is subjected to the thinning-out processing horizontally and vertically in the SD-signal-producing unit 252, thereby producing the image signals Va' as the student signals. In this case, the parameters, r and z for adjusting image quality are also supplied into the SD-signal-producing unit 252 as the control signal, thereby serially producing plural image signals Va' with them varying in steps in the frequency characteristics and the noise addition amounts.

In the class-tap-selecting unit 254, multiple items of pixel data that are positioned around the target position in the image signal Vb' are selectively extracted as the class tap data based on the image signals Va'. These items of pixel data are supplied to the class-detecting unit 255. This class-detecting unit 255 then performs data compression processing such as ADRC processing on respective items of the pixel data, thereby producing the class code CL indicating a class to which the pixel data of the target position in the image signal Vb' belongs. This class code CL is supplied to the normal-equation-producing unit 257.

Also, in the prediction-tap-selecting unit 253, based on the image signals Va', multiple items of the pixel data xi, as the prediction tap data, that are positioned around the target position in the image signal Vb' are selectively extracted. These items of pixel data xi are also supplied to the normal-equation-producing unit 257. In the teacher-tap-selecting unit 256, based on the image signals Vb', the pixel data y of the target position in the corresponding image signal Vb' is also selectively extracted. This pixel data y is also supplied to the normal-equation-producing unit 257.

Then, the normal-equation-producing unit 257 produces the normal equations (see the equation (11)) for producing the coefficient seed data, $w_{i0}$ to $w_{i9}$, for each combination of the class and the output pixel subjecting to each of the target positions in the image signal Vb', in correspondence to the pixel data y of the corresponding respective target positions, items of the pixel data xi, as prediction tap data, each corresponding to the pixel data y thus given, the class code CL indicating to the class to which the pixel data y of each of the target positions belongs, the values of the parameters, r and z for adjusting image quality supplied to the SD-signal-producing unit 252.

Then, the coefficient-seed-data-determining unit 258 receives data on this normal equation from this normal-equation-producing unit 257, and solves this normal equation by using the sweeping-out (Gauss-Jordan elimination) method or the like to obtain the coefficient seed data, $w_{i0}$ to $w_{i9}$, for each combination of the class and the output pixel. These items of the coefficient seed data, $w_{i0}$ to $w_{i9}$, are supplied to and stored in the coefficient seed memory 259.

Thus, in the coefficient-seed-data-generating apparatus 250 shown in FIG. 21, the items of the coefficient seed data, $w_{i0}$ to $w_{i9}$, to be stored in the coefficient memory 83 of the removable substrate 70 can be generated.

As described above, the storage unit 81 of the removable substrate 70 in the image-processing apparatus 51 shown in FIG. 1 stores the amount of noise for every frame detected by the image-quality-altering unit 63A at the automatic mode and the manual mode as well as, if the value of noise reduction level is adjusted in the noise-amount-detecting unit 63B at manual mode, the storage unit 81 also stores the paired data relative to data on adjusted value of noise reduction level and data on an amount of noise at adjustment thereof for every adjustment.

Therefore, if the removable substrate 70 is collected, adjustment information on the value of noise reduction level (information on correspondence between the value of noise reduction level and the amount of noise, and information on the adjustment region of the value of noise reduction level) that is suited to the user's use environment and user's preference can be obtained based on the stored contents in the storage unit 81. Thus, the process to obtain the adjustment information on the value of noise reduction level or the like is not performed in the image-processing apparatus 51, thereby preventing a configuration of the image-processing apparatus 51 itself from being complicated.

The above embodiments have been described in that the removable substrate is provided with its storage unit 81 so that, by collecting the removable substrate 70, the adjustment information on the value of noise reduction level that is suited to the user's use environment and user's preference can be obtained based on the stored contents in the storage unit 81. It, however, is conceivable that a storage device connected to a network can be used.

Figure 22:
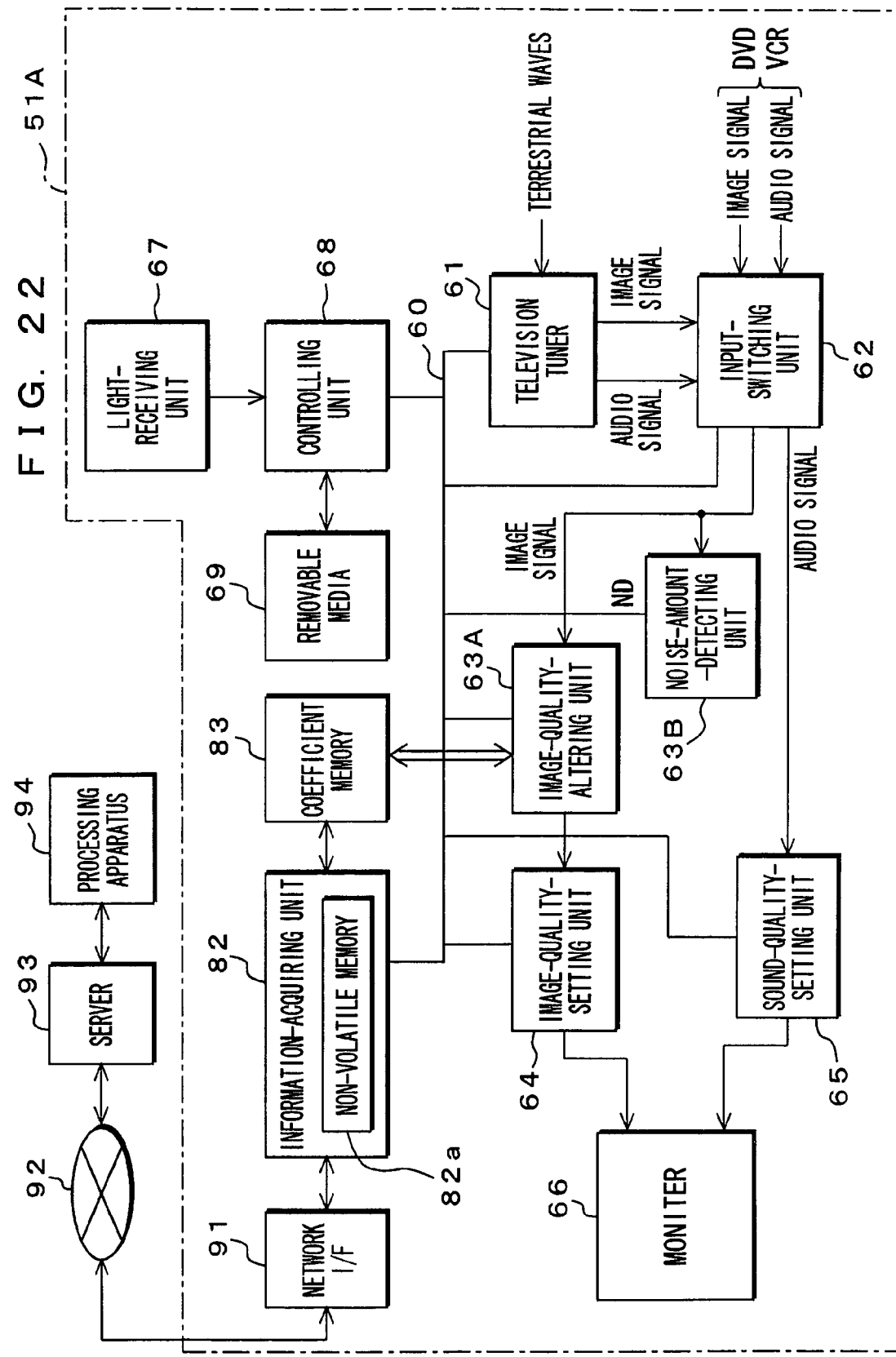
FIG. 22 is block diagram for showing a configuration of another embodiment of an image-processing apparatus according to the invention.

FIG. 22 shows a configuration of another embodiment of an image-processing apparatus according to the invention. The image-processing apparatus is an embodiment in which a server connected to a network is used as storage device. In FIG. 22, like reference numbers are applied to like members shown in FIG. 1, the detailed explanation of which will be omitted.

The image-processing apparatus 51A shown in FIG. 22 has a network interface (referred to as "network I/F") 91. The information-acquiring unit 82 is connected to a network 92 such as the Internet through this network I/F 91. The network 92 is connected to a server 93 constituting the storage device. Thus, the amount of noise and the paired data relative to data on the value of noise reduction level and data on the amount of noise that has been acquired in the information-acquiring unit 82 can be supplied to the server 93 through the network 92 and stored in the server 93.

The server 93 is connected to a processing apparatus 94. This processing apparatus 94 performs any processing to obtain adjustment information of the value of noise reduction level (information on correspondence between an amount of noise and a value of noise reduction level, and information on adjustment region of the value of noise reduction level) that is suited to the user's use environment and user's preference, based on the stored contents in the server 93. The adjustment information of the value of noise reduction level thus obtained in the processing apparatus 94 is stored in a given storage region in the server 93. Therefore, the image-processing apparatus 51A can obtain the adjustment information of the value of noise reduction level that is suited to the user's use environment and user's preference, from the server 93 through the network 92 and store it in the non-volatile memory 82a of the information-acquiring unit 82 to use it.

Other configuration and operation of the image-processing apparatus 51A shown in FIG. 22 are similar to those of the image-processing apparatus 51 shown in FIG. 1, so that the detailed explanation thereof will be omitted. According to the image-processing apparatus 51A, even if the removable substrate 70 shown in FIG. 1 is not collected, it is possible to obtain the adjustment information of the value of noise reduction level that is suited to the user's use environment and the user's preference.

Although the noise reduced, as described in the above embodiments, is white noise contained in an image signal, the invention is not limited thereto. For example, noise reduction may be similarly applied to other noise such as ghost noise, block noise, mosquito noise, and ringing.

Although the image signal has been described in the above embodiments as an informational signal, the invention is not limited to this. This invention is similarly applicable to an audio signal as the informational signal. In this case, as noise contained in the received audio signal, white noise, encoding noise and the like are conceivable.

Thus, the embodiments of the invention are preferably applied to an image display apparatus, an audio apparatus and the like, by which the adjustment information on the value of noise reduction level that is suited to the user's use environment and user's preference is attained.

According to the embodiments of the invention, at least the amount of noise detected from the received informational signal or the paired data relative to data on the value of noise reduction level that is adjusted by a user and data on the amount of noise detected from the received informational signal at this adjustment is controlled so as to be stored in the storage unit or device, thereby allowing the adjustment information of the value of noise reduction level that is suited to the user's use environment and user's preference to be obtained based on the stored contents in the storage unit or device.

It should be understood by those skilled in the art that various modifications, combinations, sub-combinations and alternations may occur depending on design requirements and other factors insofar as they are within the scope of the appended claims or the equivalents thereof.

The invention is claimed as follows:

1. An information-processing apparatus comprising:
   noise-reduction-processing means for reducing noise included in a received informational signal;
   adjustment means for allowing a user to adjust a value of noise reduction level in the noise-reduction-processing means;
   noise-amount-detecting means for detecting an amount of the noise contained in the received informational signal; and
   storage control means for controlling storage of at least one of: (a) an amount of noise that is detected by the noise-amount-detecting means, and (b) paired data relative to data on a value of the noise reduction level that is adjusted by the adjustment means and data on an amount of noise that is detected by the noise-amount-detecting means at the adjustment by the adjustment means.

2. The information-processing apparatus according to claim 1, further comprising first storage means for storing the amount of noise and the paired data.

3. The information-processing apparatus according to claim 2, further comprising:
   an information-processing device; and
   a removable substrate detachably connected to the information-processing device,
   wherein the information-processing device includes the noise-reduction-processing means, the adjustment means, and the noise-amount-detecting means; and
   wherein the removable substrate includes the storage control means and the first storage means.

4. The information-processing apparatus of claim 1, further comprising storage means and a network interface,
   wherein the storage means is connected to a prescribed network; and
   wherein the storage control means is connected to the storage means via the network interface and the network.

5. The information-processing apparatus according to claim 1, further comprising:
   first holding means for holding information on correspondence between an amount of noise and a value of the noise reduction level; and
   noise-reduction-level-value-controlling means for automatically controlling a value of the noise reduction level in the noise-reduction-processing means to be equal to a value of the noise reduction level, corresponding to an amount of noise detected in noise-amount-detecting means based on the information on correspondence between the amount of noise and the value of the noise reduction level, said information being stored in the first holding means.

6. The information-processing apparatus according to claim 5, wherein the information on correspondence between the amount of noise and the value of noise reduction level, which is stored in the first holding means, is acquired by using multiple items of the paired data.

7. The information-processing apparatus according to claim 6, wherein the information on correspondence between the amount of noise and the value of noise reduction level is acquired by determining a primary approximating line indicating the correspondence between the amount of noise and the value of noise reduction level using multiple items of the paired data.

8. The information-processing apparatus according to claim 7, wherein said multiple items of the paired data are used after the paired data has been weighted with a stored period of time.

9. The information-processing apparatus according to claim 7, wherein an axis of said amount of noise is divided into plural sections and said primary approximating line is determined for every section.

10. The information-processing apparatus according to claim 1, further comprising:
    holding means for holding information on an adjustment region of the value of noise reduction level to be adjusted by the adjustment means; and
    adjustment region restriction means for restricting a region of the value of noise reduction level to be able to be adjusted by the adjustment means, in a manual mode, based on said information being stored in the holding means.

11. The information-processing apparatus according to claim 10, wherein the adjustment region of the value of noise reduction level, which is held in the holding means, is determined by using multiple items of the paired data, said paired data including data on the value of noise reduction level and data on the amount of noise.

12. The information-processing apparatus according to claim 11, wherein the adjustment region of the value of noise reduction level is determined based on a frequency of a maximum value and a frequency of a minimum value of the noise reduction level included within the plural values of the noise reduction levels.

13. The information-processing apparatus according to claim 11, wherein the adjustment region of the value of noise reduction level is determined based on a weighted center of the plural values of the noise reduction levels.

14. The information-processing apparatus according to claim 13, wherein the plural values of the noise reduction levels are used after the values of the noise reduction levels have been weighted with a stored period of time thereof.

15. The information-processing apparatus according to claim 1, wherein the noise-reduction-processing means includes:

data-selecting means for selecting multiple items of informational data based on the received informational signal, said multiple items of informational data being positioned around a target position in an output informational signal;

coefficient-data-generating means for generating coefficient data of an estimate equation using coefficient seed data and the value of the noise reduction level; and calculation means for calculating and obtaining informational data of the target position in the output informational signal based on the estimate equation using the multiple items of the informational data, which have been selected in the data-selecting means, and the coefficient data, which has been generated in the coefficient-data-generating means, wherein the information-processing apparatus further comprises holding means for holding the coefficient seed data.

16. An information-processing apparatus comprising:

a noise-reduction-processing unit configured to reduce noise contained in a received informational signal;

an adjustment unit configured to allow a user to adjust a value of a noise reduction level in the noise-reduction-processing unit;

a noise-amount-detecting unit configured to detect an amount of the noise contained in the received informational signal; and a storage control unit configured to control storage of at least one of: (a) an amount of noise that is detected by the noise-amount-detecting unit, and (b) paired data relative to data on a value of noise reduction level that is adjusted by the adjustment unit and data on an amount of noise that is detected by the noise-amount-detecting unit at the adjustment by the adjustment unit.

17. A removable substrate that is detachably connected to an information-processing apparatus, the apparatus comprising:

noise-reduction-processing means for reducing noise contained in a received informational signal;

adjustment means for allowing a user to adjust a value of a noise reduction level in the noise-reduction-processing means; and noise-amount-detecting means for detecting an amount of the noise contained in the received informational signal;

wherein said removable substrate includes storage means for storing at least one of: (a) an amount of noise that is detected by the noise-amount-detecting means, and (b) paired data relative to data on a value of noise reduction level that is adjusted by the adjustment means and data on an amount of noise that is detected by the noise-amount-detecting means at the adjustment by the adjustment means.

18. The removable substrate according to claim 17, further comprising a first holding means for holding information on correspondence between an amount of noise and a value of the noise reduction level.

19. The removable substrate according to claim 17, further comprising a holding means for holding information on an adjustment region of the value of the noise reduction level to be adjusted by the adjustment means.

20. A removable substrate that is detachably connected to an information-processing apparatus, the apparatus comprising:

a noise-reduction-processing unit configured to reduce noise contained in a received informational signal;

an adjustment unit configured to allow a user to adjust a value of noise reduction level in the noise-reduction-processing unit; and a noise-amount-detecting unit configured to detect an amount of the noise contained in the received informational signal;

wherein said removable substrate includes a storage unit configured to store at least one of an amount of: (a) noise that is detected by the noise-amount-detecting unit, and (b) paired data relative to data on a value of noise reduction level that is adjusted by the adjustment unit and data on an amount of noise that is detected by the noise-amount-detecting unit at the adjustment by the adjustment unit.

* * * * *